United States Patent

Korn

(12) United States Patent
(10) Patent No.: US 6,665,458 B2
(45) Date of Patent: Dec. 16, 2003

(54) IN-PACKAGE TEMPORALLY MODULATED REFERENCE SOURCE FOR TUNABLE OPTICAL FILTER SYSTEM

(75) Inventor: Jeffrey A. Korn, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/934,664

(22) Filed: Aug. 22, 2001

(65) Prior Publication Data

US 2003/0210847 A1 Nov. 13, 2003

(51) Int. Cl.[7] .............................. G02B 6/26; G02B 6/42
(52) U.S. Cl. ........................................................ 385/15
(58) Field of Search ................................ 385/14–18, 31, 385/38, 88, 92, 73; 359/73, 129

(56) References Cited

U.S. PATENT DOCUMENTS

| | | | | |
|---|---|---|---|---|
| 5,281,931 A | * | 1/1994 | Bailey et al. ............... | 333/17.1 |
| 5,969,834 A | * | 10/1999 | Farber et al. ............... | 359/110 |
| 6,144,678 A | * | 11/2000 | Hamada ...................... | 372/20 |
| 6,374,007 B1 | * | 4/2002 | Hagelin et al. ............. | 385/17 |
| 6,375,364 B1 | * | 4/2002 | Wu ............................. | 385/88 |
| 6,426,830 B1 | * | 7/2002 | Robinson .................... | 359/308 |
| 6,542,659 B2 | * | 4/2003 | Flanders ...................... | 385/20 |

* cited by examiner

Primary Examiner—Robert H. Kim
Assistant Examiner—Richard Kim
(74) Attorney, Agent, or Firm—J. Grant Houston

(57) ABSTRACT

A tunable optical filter system 10 has a reference source system 24 that is integrated with the tunable filter 22 on bench 14 and within hermetic package 12. The reference source system 24 is temporally modulated to decrease interference or crosstalk into the scan of the optical signal 64 of interest. Specifically, a system controller 100 energizes the reference source during a reference scan in which the tunable filter 22 is scanned across a spectrum of the optical reference 66. The controller 100, however, lowers, such as simply decreasing or entirely cutting, power to the reference source system 24 during a signal scan, in which the tunable filter 22 is scanned across the optical signal's spectrum. In this way, interference during the signal scan from the reference source system is reduced.

23 Claims, 13 Drawing Sheets

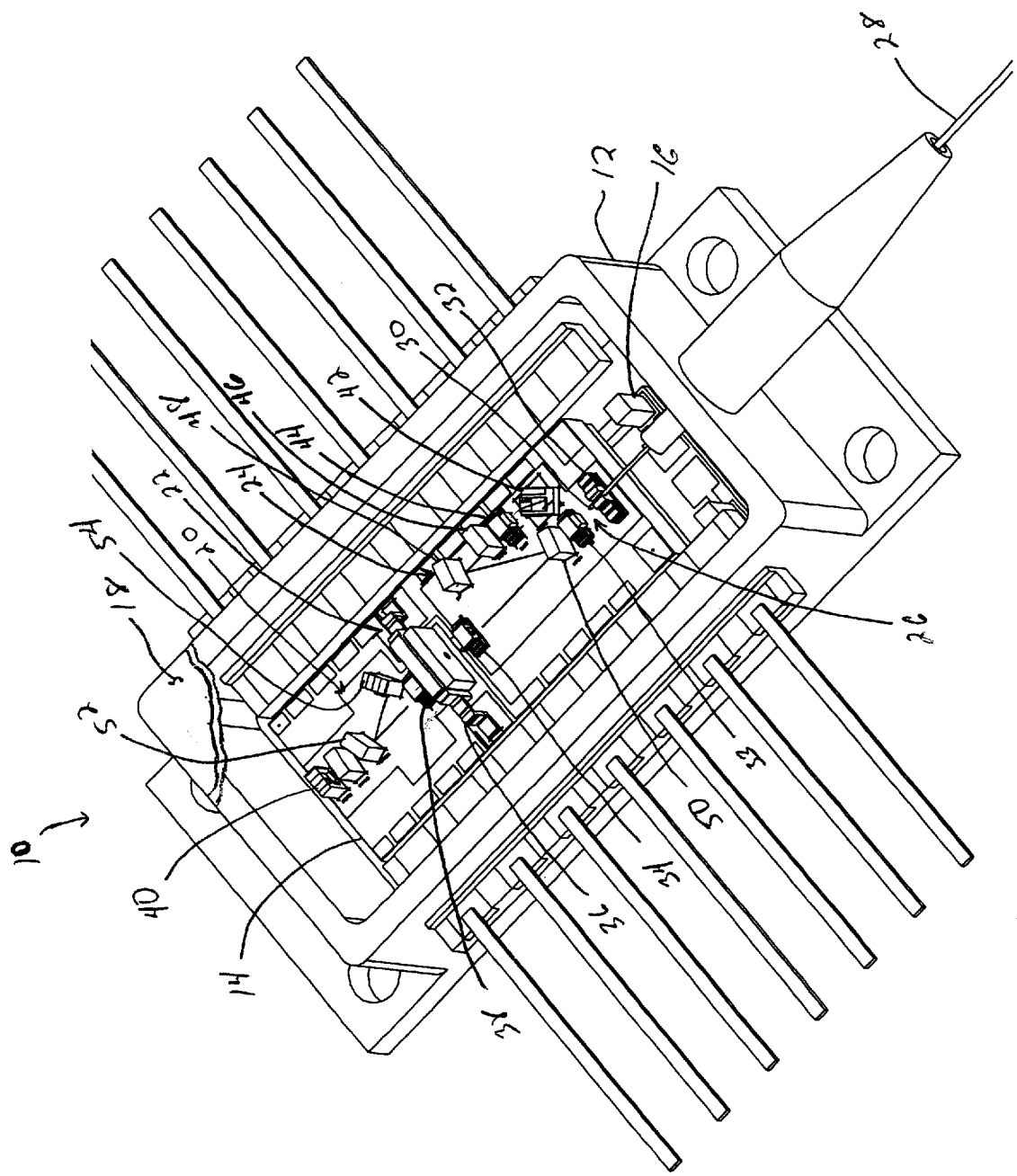

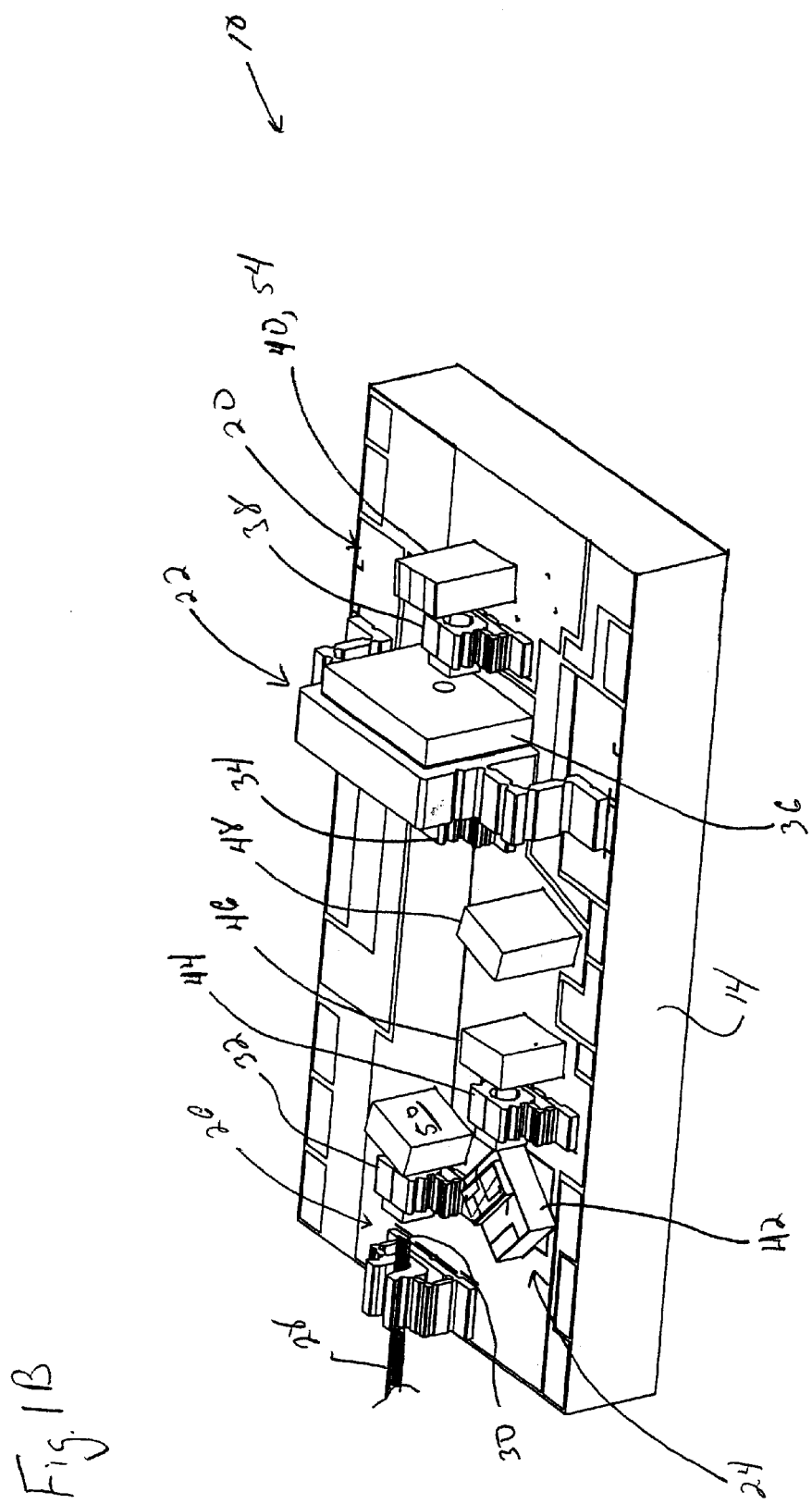

IN-PACKAGE TEMPORALLY MODULATED REFERENCE SOURCE FOR TUNABLE OPTICAL FILTER SYSTEM

BACKGROUND OF THE INVENTION

In wavelength division multiplexed (WDM) systems, tunable optical filter systems are typically used in monitoring applications. The filters, however, are also applicable to wavelength add/drop or routing devices, tunable receivers, and tunable sources, for example. Moreover, tunable optical filter systems have relevance to other applications. Remote trace chemical specie detection is one example.

In these applications, wavelength accuracy/stability is desirable. Many times discrimination of a few Gigahertz is necessary, with hundreds of Megahertz being desirable.

Achieving this level of wavelength stability through the design of the tunable filter can be challenging. It requires that the optical cavity length, in the case of a Fabry-Perot tunable filter, be controlled to picometers, for the infrared wavelengths, over the device's lifetime, which can be many years. Changes in optical cavity spacing, electrostatic cavity spacing (if used), and membrane spring constant can yield measurement shifts. Capacitive sensors typically do not have the stability required to compensate for these shifts.

As a result, many systems utilize reference sources that generate an optical reference signal with stable, known spectral features. The system's tunable filter is scanned across these spectral features, and the system uses the detected position of the features in a calibration for a subsequent scan of the signal.

SUMMARY OF THE INVENTION

The common approach for calibration using a reference source is to periodically switch in the reference source onto the optical fiber pigtail that transmits optical signals to the fiber-based or microelectromechanical system (MEMS) based filter, for example. This allows the system to calibrate the tunable optical filter against the spectral features of the reference source, and then switch to the optical signal for the scan of interest.

There are a number of problems or drawbacks associated with this scheme. First, the process of switching between the optical signal and the reference source can disturb the behavior of the tunable optical filter. This injects some uncertainty into the calibration. Moreover, the resulting system has a relatively low level of integration since the reference source system is not integrated with the tunable filter. Separate fiber pigtails are required between the system and each of the optical signal source and the reference source system.

An alternative approach is to integrate the reference source system with the tunable optical filter on a common optical bench using micro-optical bench technology, for example. This allows the reference source system, tunable optical filter, and possibly a detector system to be integrated together within a single, small hermetic package.

Experimentation, however, has demonstrated that a different set of problems can arise in these relatively highly integrated systems, especially when free space optical interconnects are used. Stray light can exist within the package that can be detected during the signal scan. This has the effect of raising the noise floor of the system, impacting system performance.

The present invention is directed to a tunable optical filter system. It has a reference source that is integrated with the tunable filter. According to the invention, this reference source is temporally modulated to decrease interference or crosstalk into the scan of the optical signal of interest.

In general, according to one aspect, the invention features a tunable optical filter system. The system comprises a package and a tunable filter, which is installed within the package. A reference source system is further commonly installed within the package. This reference source system generates an optical reference that is filtered by the tunable filter and typically used in its calibration. A detector system is further provided that detects the optical reference and an optical signal after being filtered by the tunable filter.

According to the invention, a system controller energizes the reference source during a reference scan in which the tunable filter is scanned across a spectrum of the optical reference. The controller, however, lowers, such as simply decreasing or entirely cutting, power to the reference source system during a signal scan, in which the tunable filter is scanned across the optical signal. In this way, interference during the signal scan from the reference source system is reduced.

In the present implementation, the package is a hermetic package. A butterfly configuration is shown. The tunable filter is a MEMS Fabry-Perot configuration, in the current implementation. The tunable filter can have a single resonant cavity or multiple resonant cavities depending on the required performance.

According to the implementation, the optical reference, which is generated by the optical reference system, comprises stable or known spectral features. The calibration of the tunable filter is made against these spectral features. In one example, the stable spectral features are generated using a light source, e.g., broadband, and a filter that generates the optical reference from the emission of the light source. The combination of a super luminescent light emitting diode (SLED) and fixed Fabry-Perot etalon has been tested.

Depending on the implementation, the detector system can comprise single or multiple detectors. In a multidetector configuration, a first detector can detect the optical reference and a second detector can detect the optical signal. Path separation can be achieved using a dichroic filter. Different orders of the filter are preferably used to scan the optical reference and the optical signal. In an alternative implementation, the detector system comprises a detector that detects both the optical reference and the optical signal.

In one embodiment, the controller ramps the tuning voltage to the tunable filter to perform the reference scan either before or after the signal scan. In the preferred embodiment, however, the reference scan is performed both before and after the signal scan to enable a two point calibration on either side of the optical signal's spectrum. These tuning voltage ramps can be increasing or decreasing, linear or non-linear, ramps. Finally, in one implementation, the controller entirely removes power to the reference source during the signal scan. Alternatively, however, the controller can simply reduce, but not entirely turn-off, power to the reference source system. This later approach can mitigate shifts due to thermal transients, for example.

In general, according to another aspect, the invention features a method for controlling a tunable optical filter system. This method comprises driving a tunable optical filter to scan over an optical reference spectrum and an optical signal spectrum. A reference source system is controlled to generate the optical reference, while the tunable filter is scanning the optical reference spectrum. While the tunable filter is scanned over the optical signal spectrum, the power to the optical reference system is lowered.

The step of driving the tunable filter can comprise ramping the drive voltage to scan the optical reference spectrum and then ramping the drive voltage to scan the optical signal spectrum. In the scan of the optical reference spectrum, the optical signal can be blocked from reaching the tunable filter.

In a preferred embodiment, the step of driving the tunable filter comprises scanning the optical reference spectrum before and after the scan of the optical signal spectrum.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
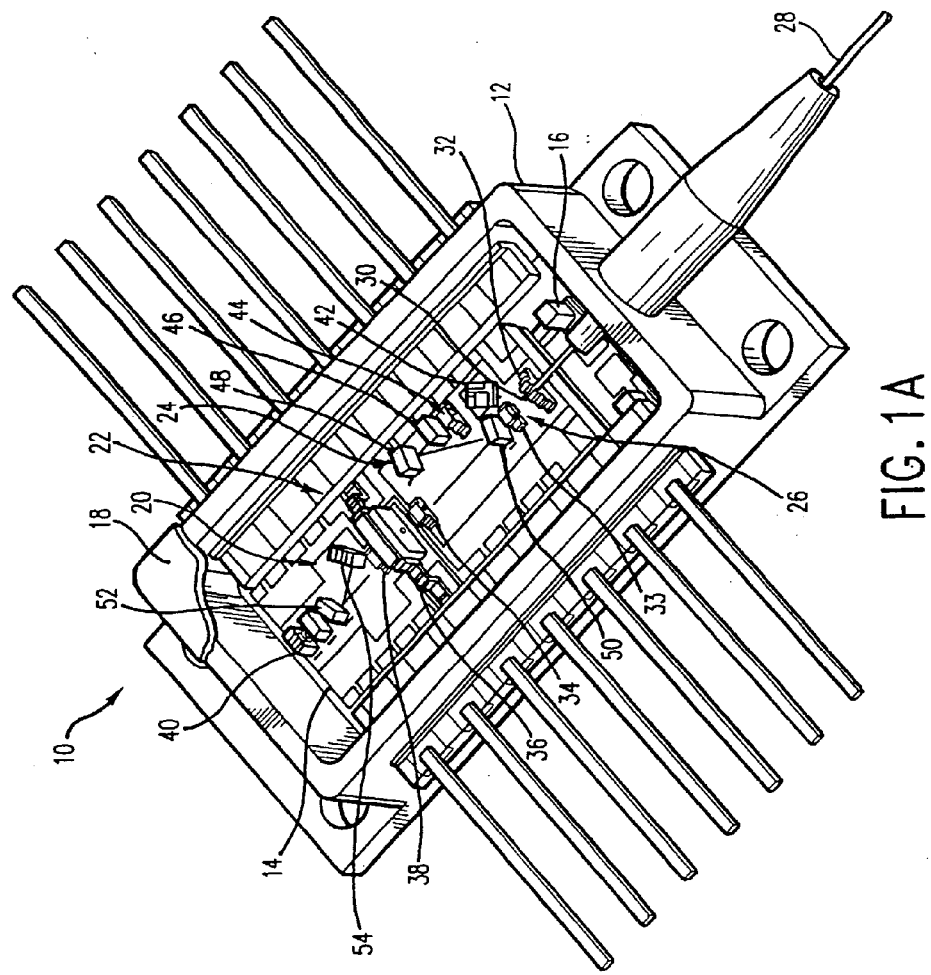
FIGS. 1A and 1B are perspective views of two integrated reference source/tunable optical filter systems to which the principles of the present invention are applicable.
Figure 1B:
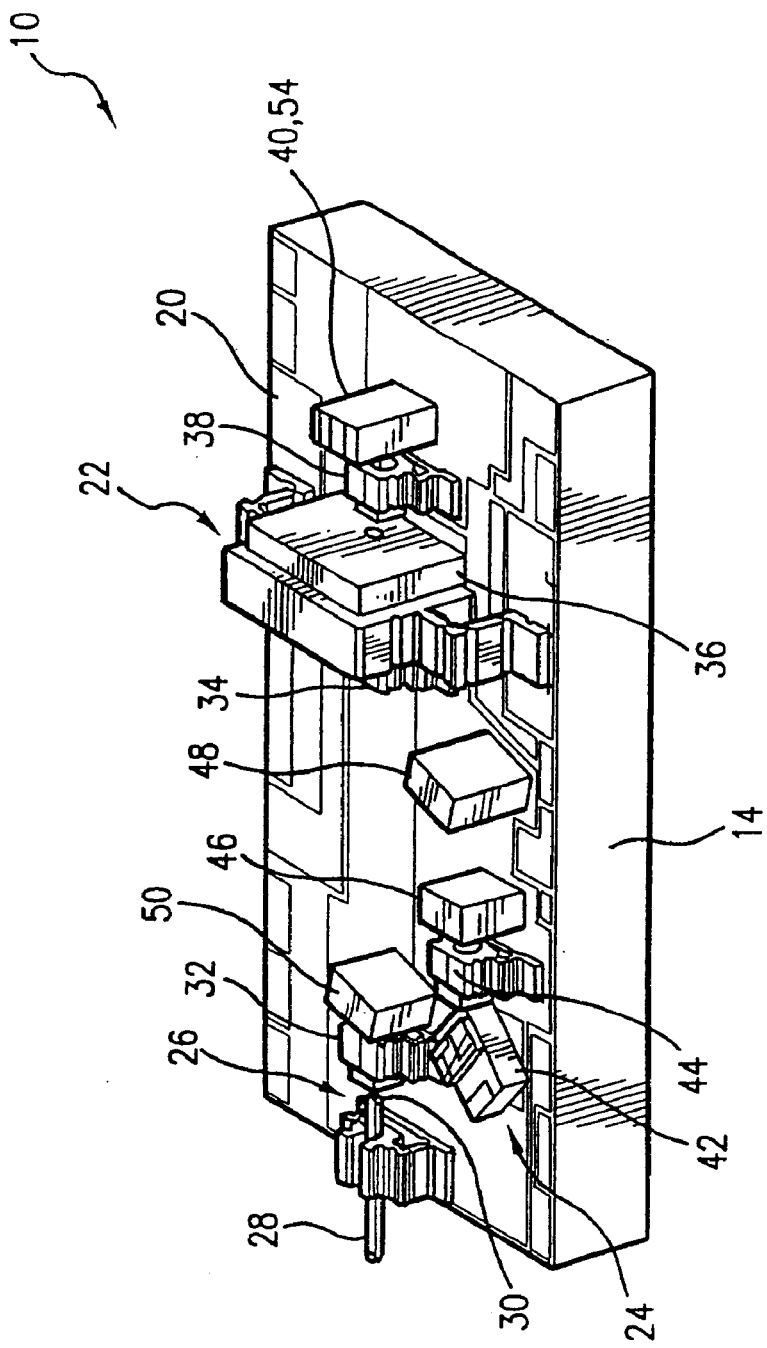
Figure 2A:
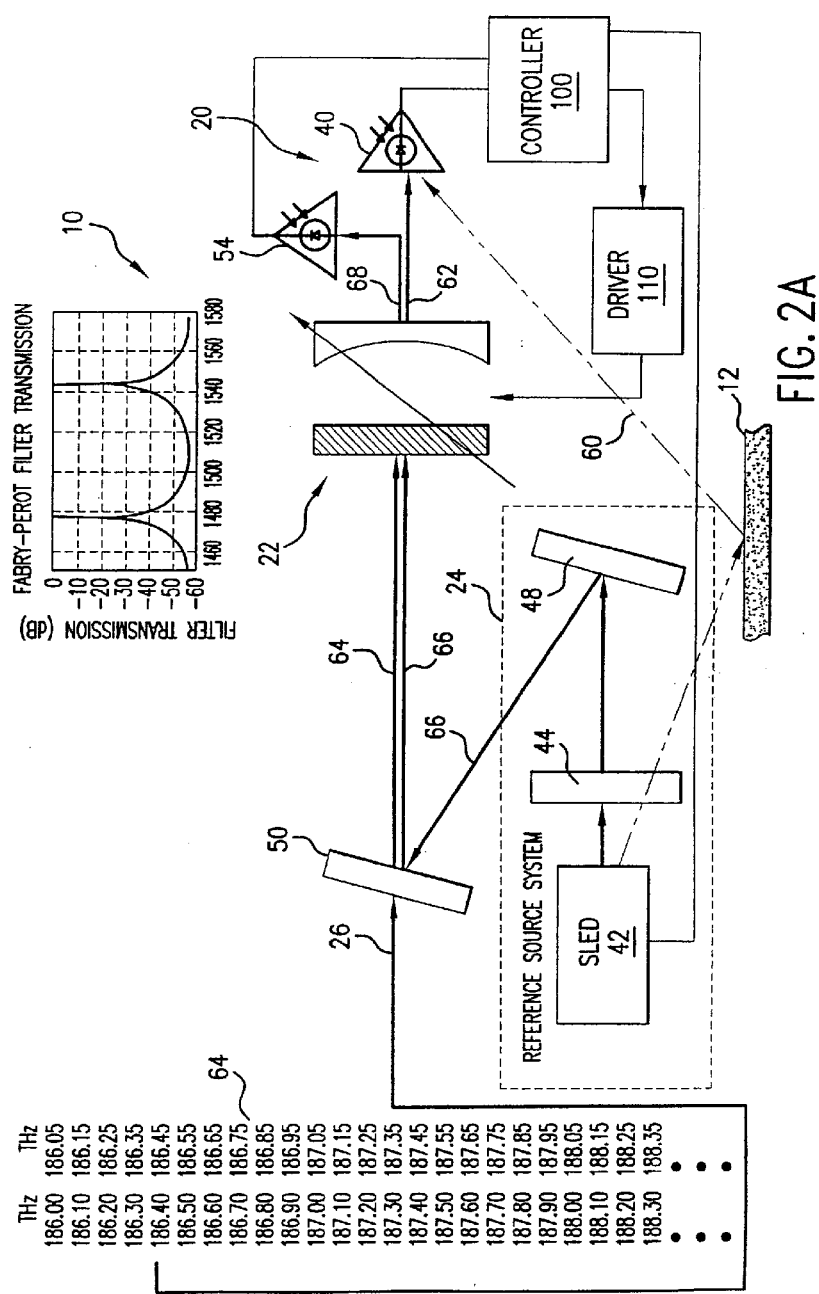
Figure 2B:
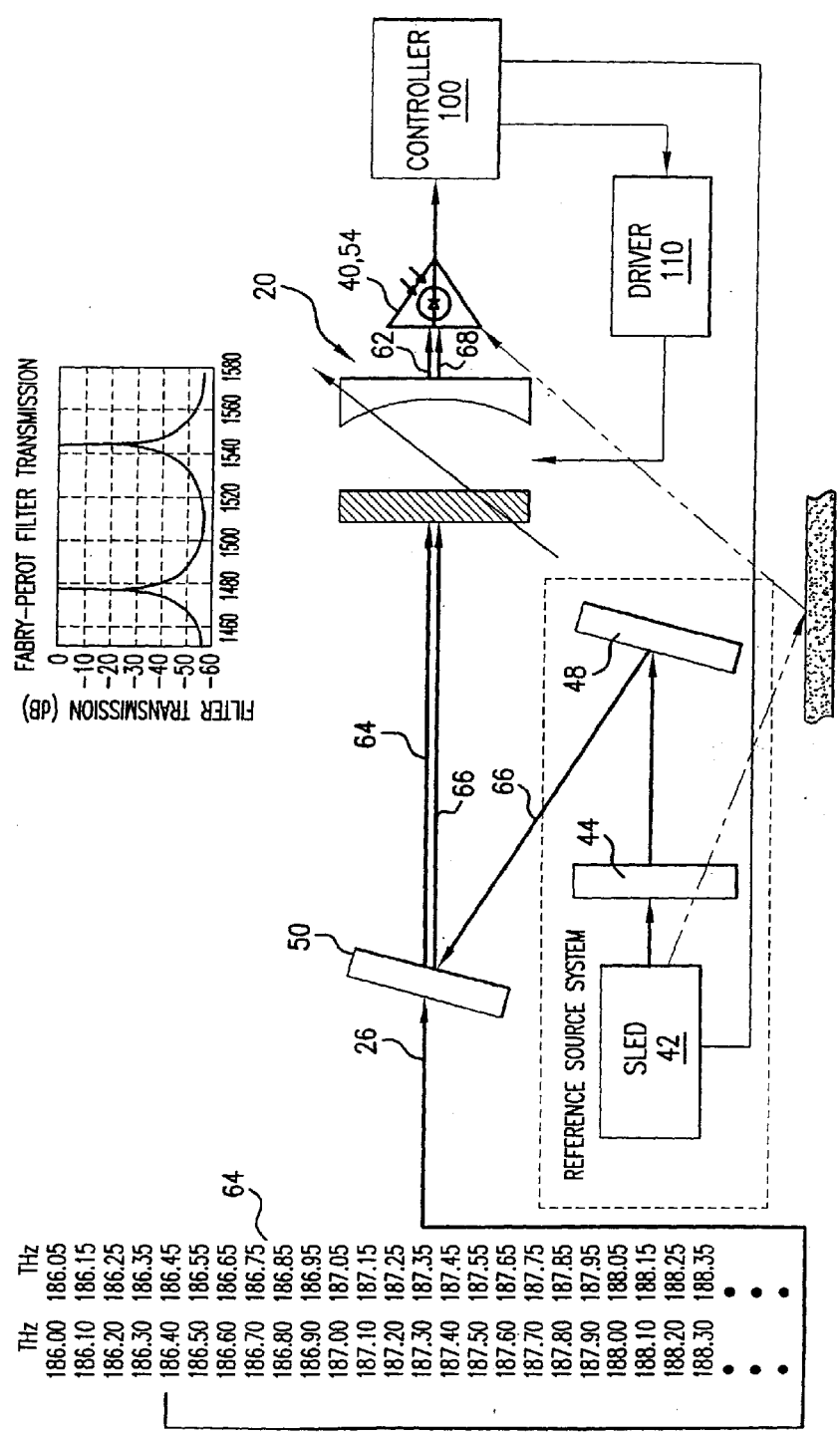
Figure 3A:
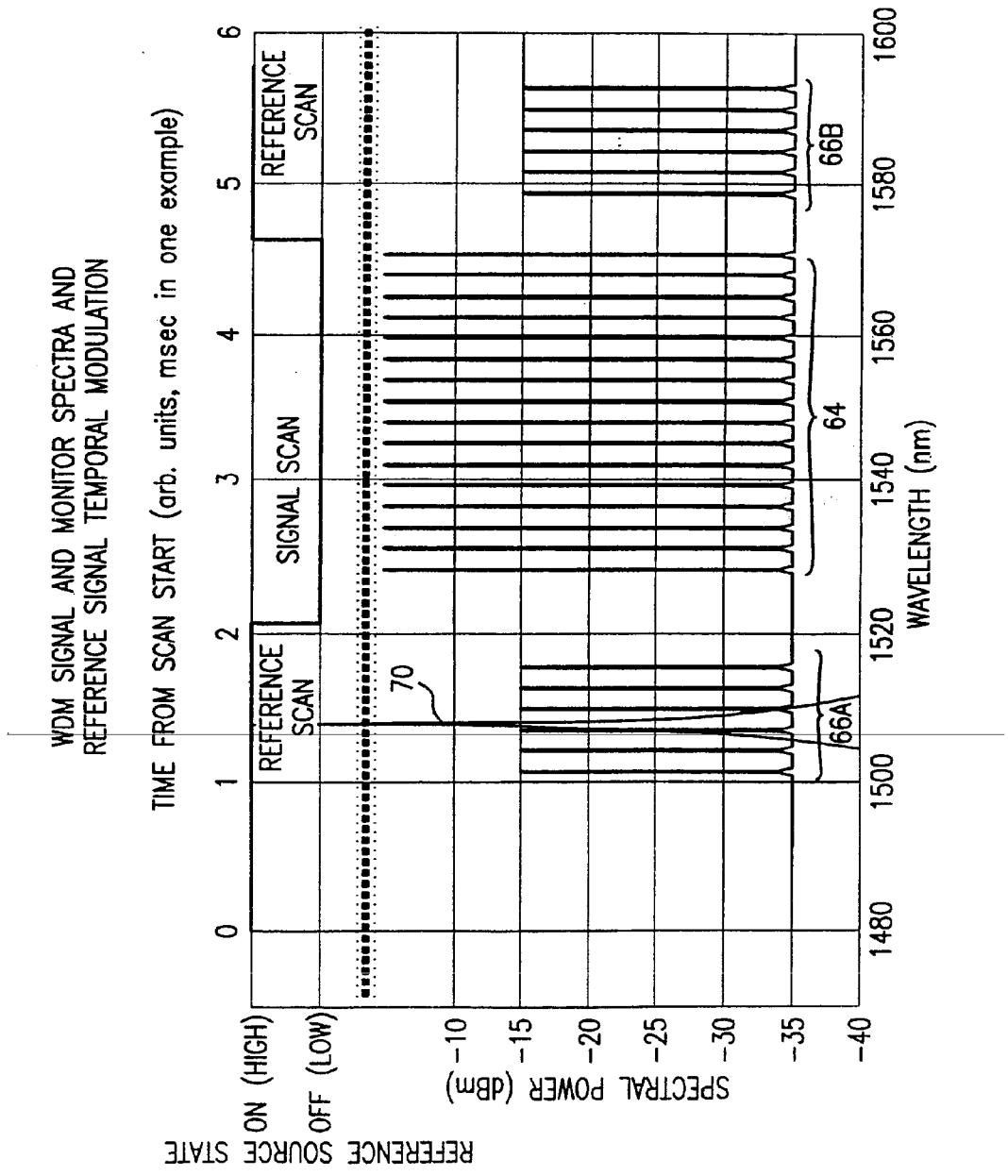
Figure 3B:
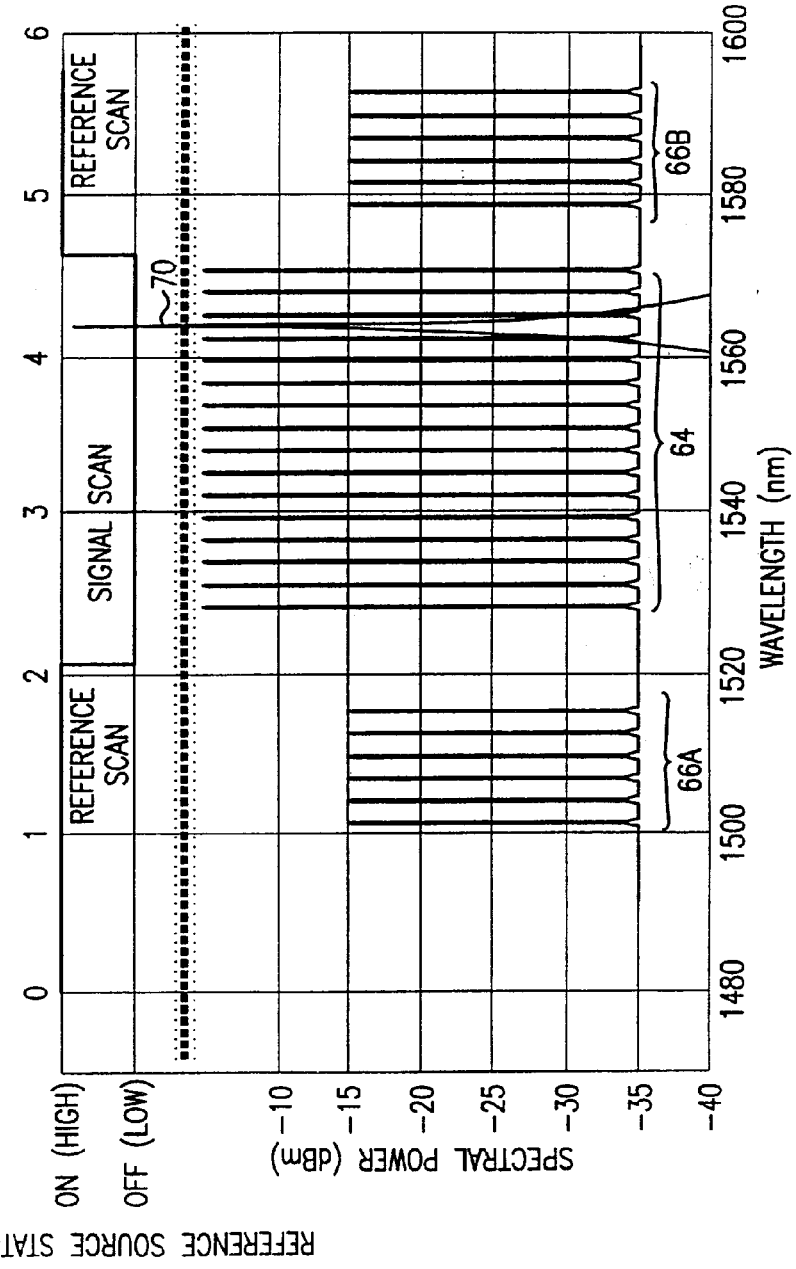
Figure 3C:
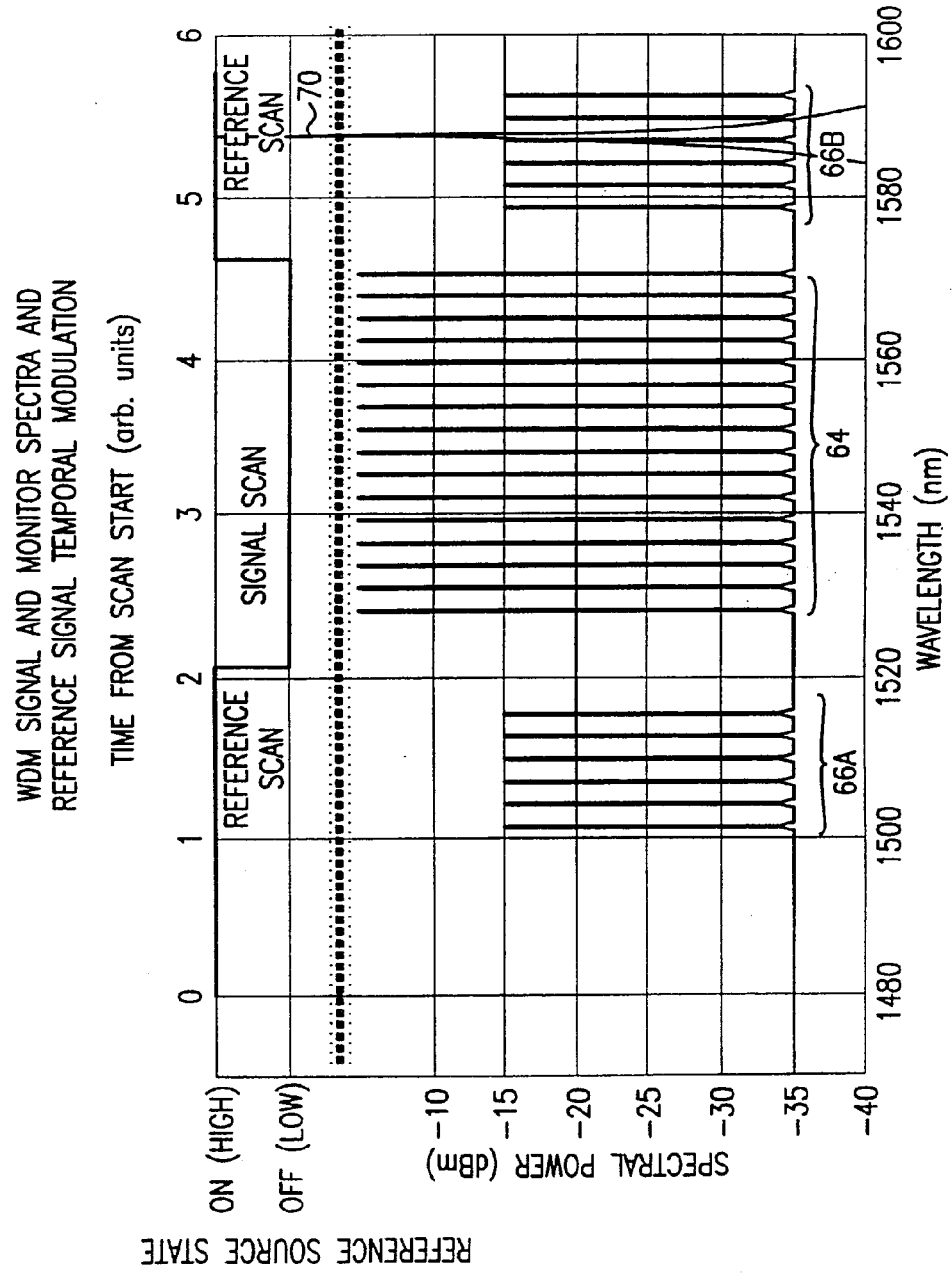
Figure 4A:
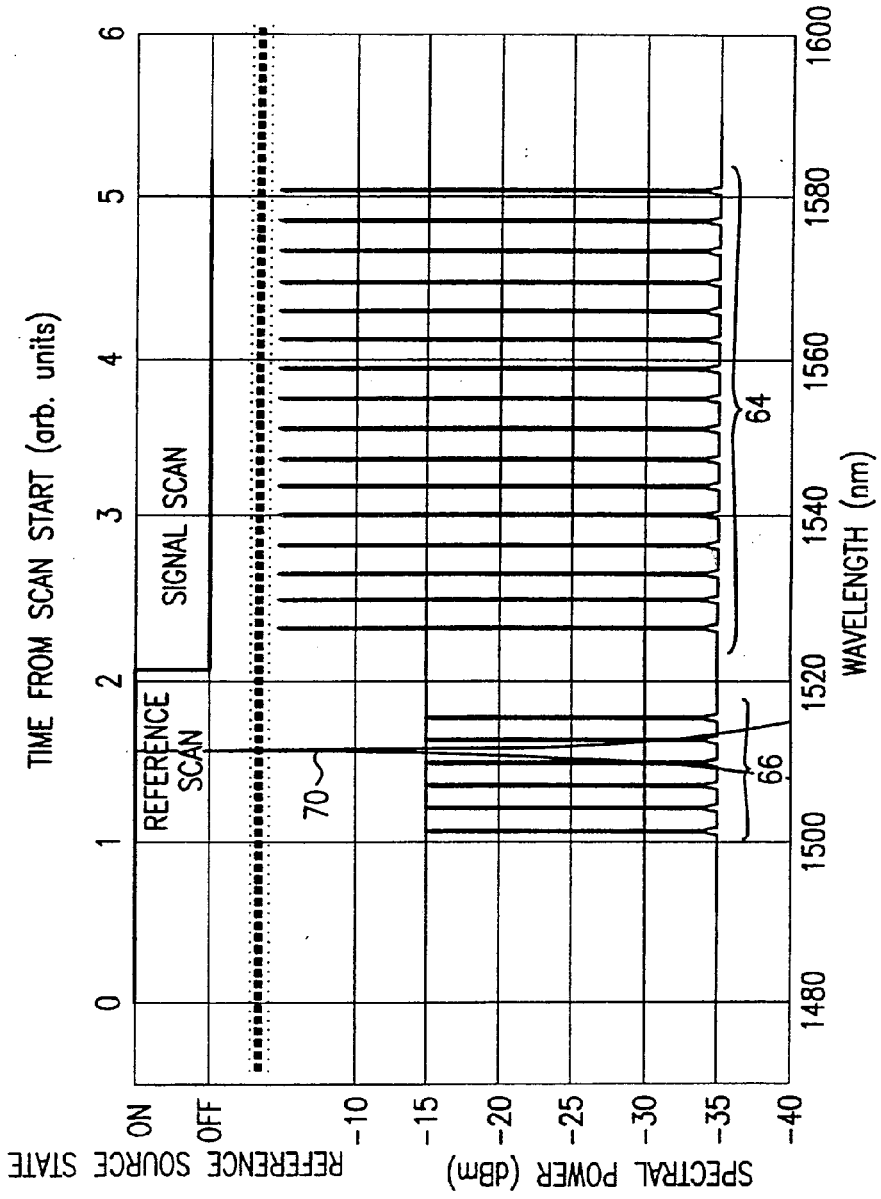
Figure 4B:
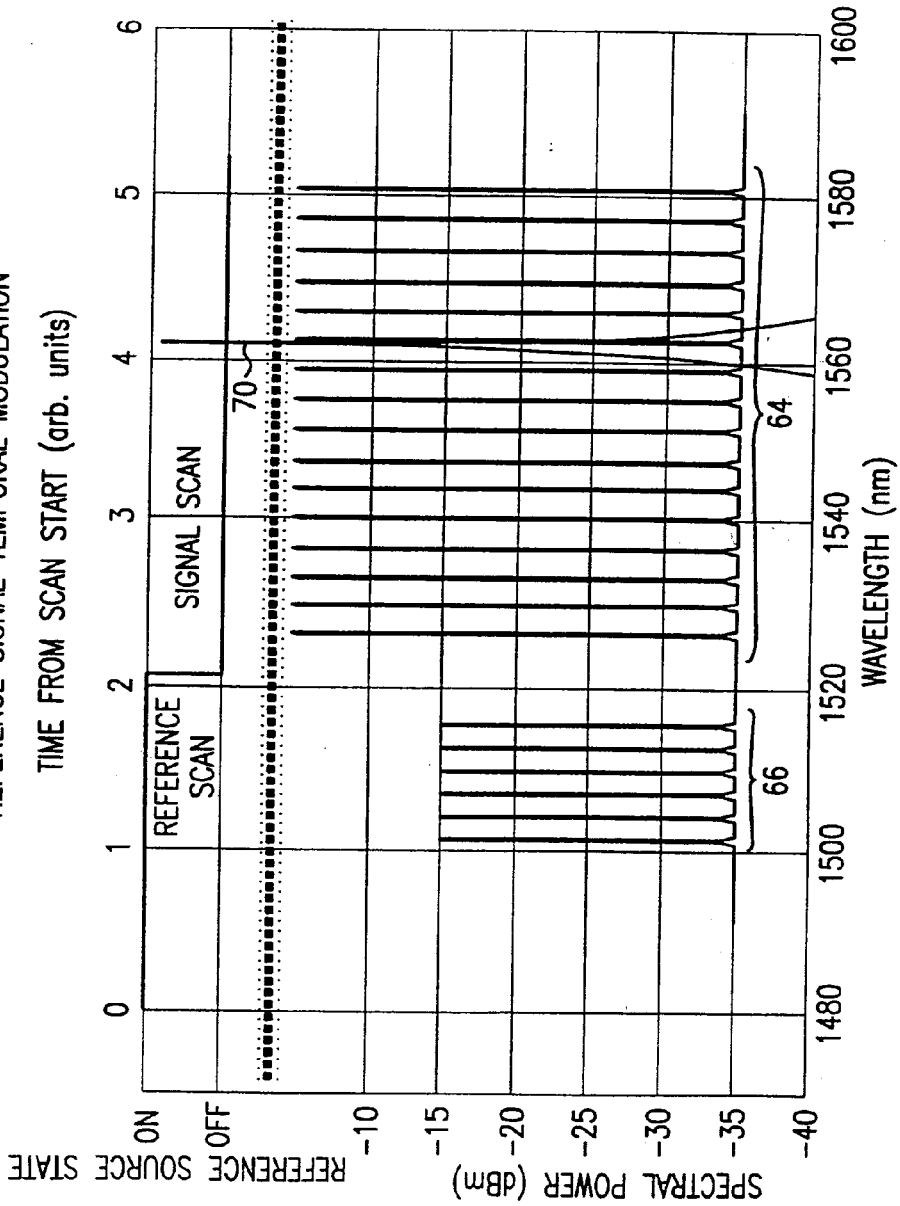
Figure 5A:
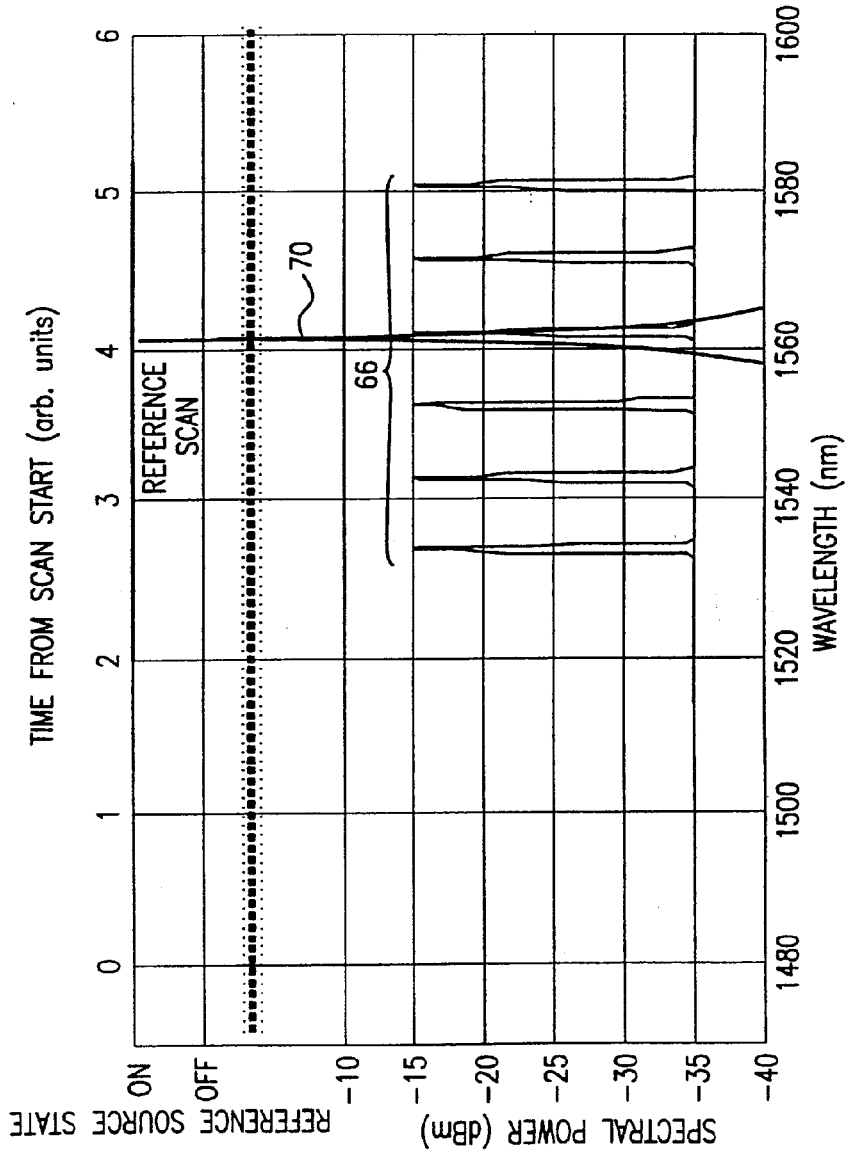
Figure 5B:
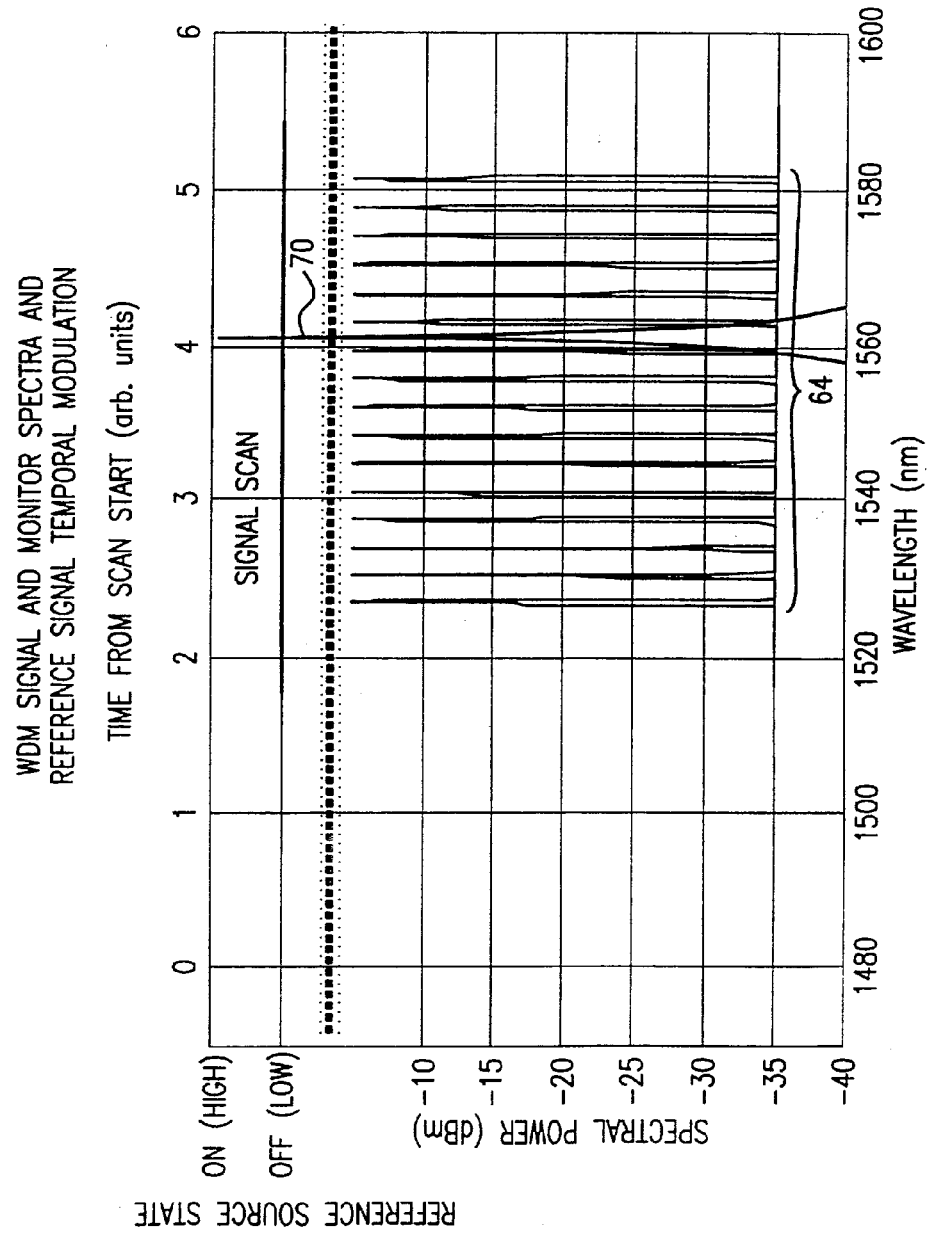
Figure 6A:
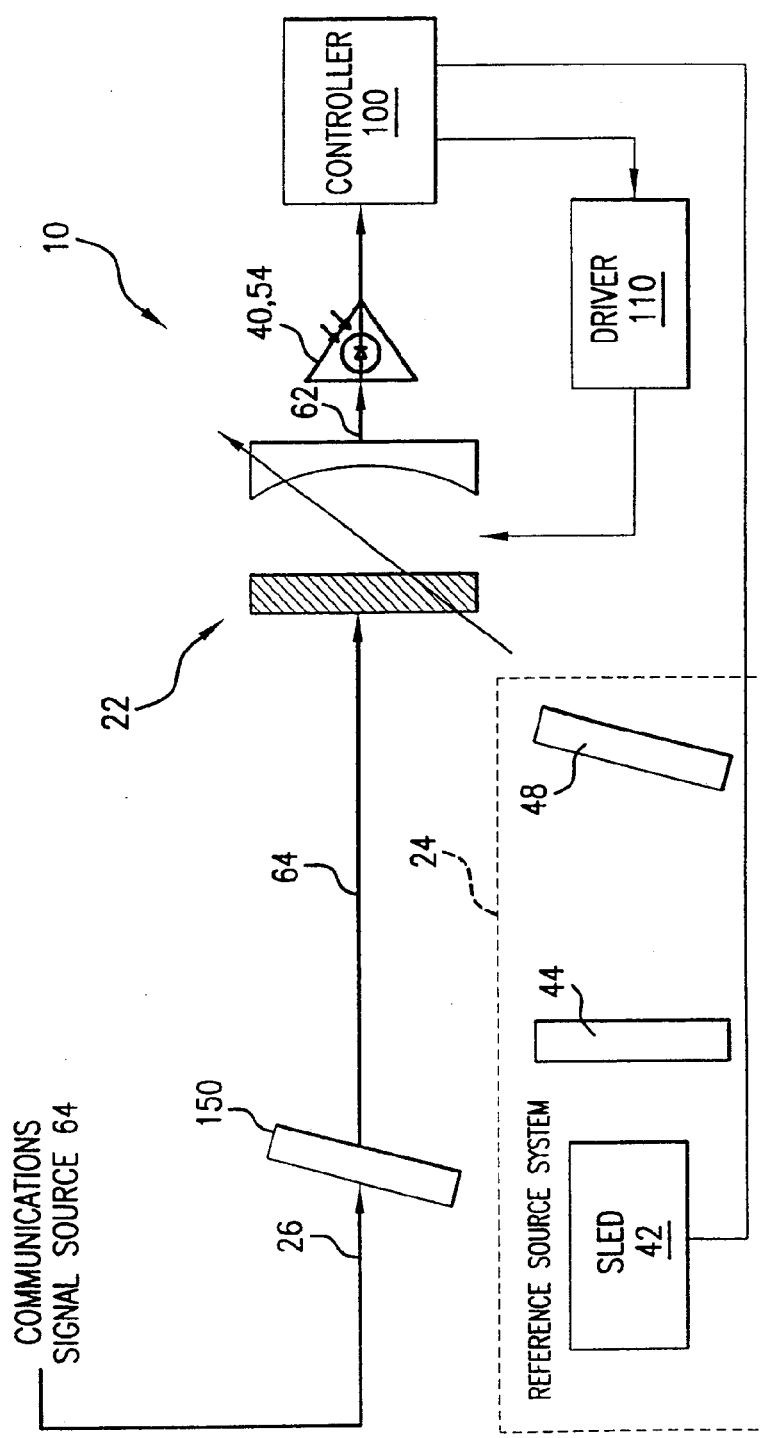
Figure 6B:
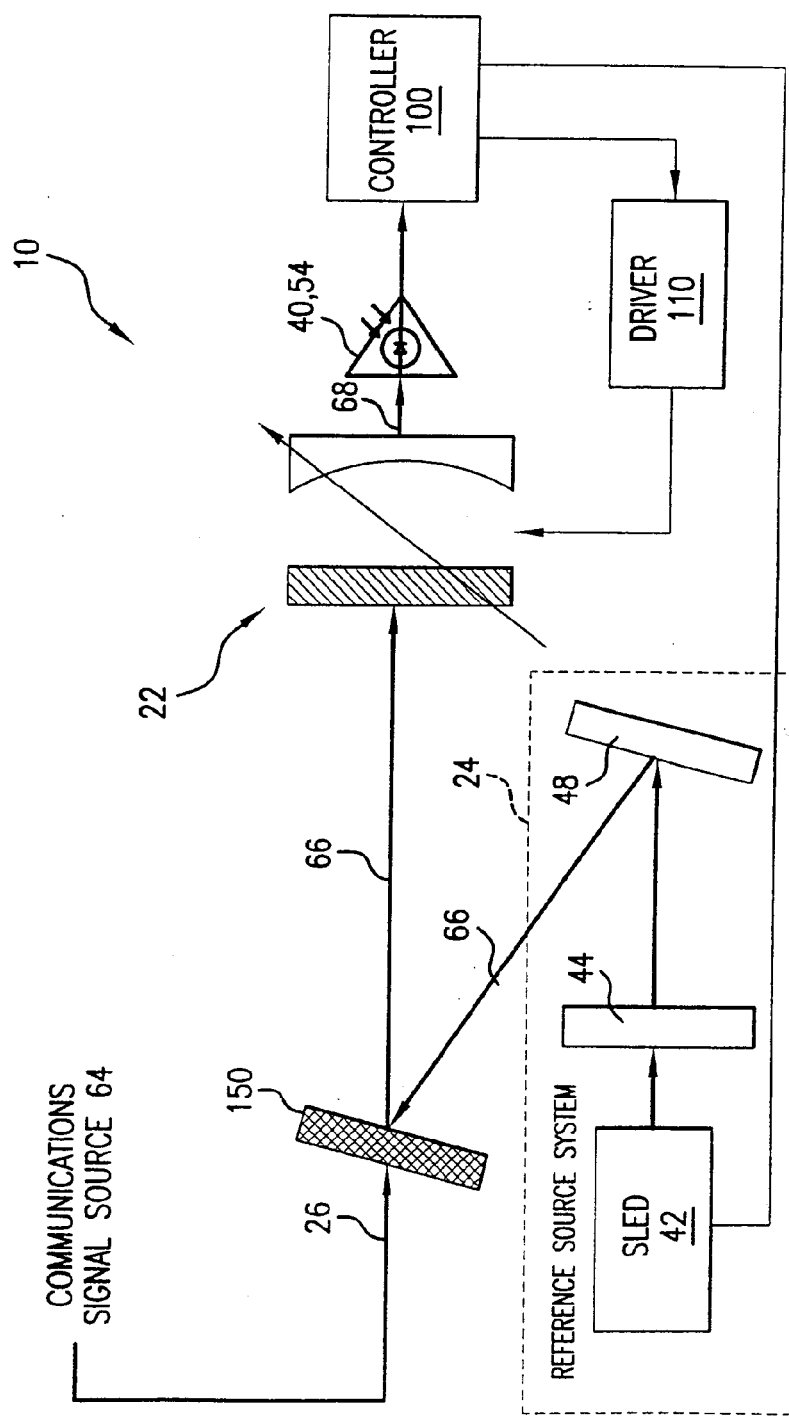

FIGS. 1A and 1B show tunable optical filter systems, to which the principles of the present invention are applicable.

Specifically, with reference to FIG. 1A, the tunable optical filter system generally comprises a package 12 and an optical bench 14, which is sometimes referred to as a submount. The bench 14 is installed in the package, and specifically on a thermoelectric (TE) cooler 16, which is located between the bench 14 and the package 12, in the specific illustrated embodiment.

The package 12, in this illustrated example, is a butterfly package. The package's lid 18 is shown cut-away in the illustration.

The optical system, which is installed on the top surface of the bench 14, generally comprises a detector system 20, a tunable filter system 22, a reference source system 24, and a signal source 26.

In more detail, the optical signal to be monitored is transmitted to the system 10 via a fiber pigtail 28, in the illustrated example. This pigtail 28 terminates at an endface 30 that is secured above the bench 14 using a fiber mounting structure 32 in the illustrated implementation. The optical signal passes through a first lens optical component 33 and a second lens optical component 34, which launches the optical signal into a tunable filter optical component 36. A MEMS implementation of the tunable filter is shown. The filtered signal passes through a third lens optical component 38 and is then detected by an optical signal detector 40.

In the illustrated implementation, each of the lens and tunable filter optical components comprises the optical element and a mounting structure that is used to secure the optical element to the bench, while enabling post installation alignment.

Turning to the path of the optical reference, the emission from a reference light source 42, such as a broadband source, e.g., a SLED, passes through reference lens optical component 44 to a fixed filter 46, which, in the present implementation, is a Fabry-Perot etalon. It converts the broadband spectrum of the SLED 42 into a series of spectral peaks, corresponding to the various orders of the etalon, thereby producing the stable spectral features of the optical reference.

The optical reference is then reflected by fold mirror 48 to a dichroic or WDM filter 50, which is tuned to be reflective at the wavelength of the optical reference, but transmissive within the band of the optical signal. Thus, the optical reference is similarly directed to the optical filter system 22.

At the detector system 20, a dichroic filter 52 reflects the optical reference to a reference detector 54.

FIG. 1B shows an operationally similar tunable optical filter system 10, for the purposes of the present invention. Reference numerals have been used for functionally equivalent parts. The differential between the two designs lies in the design of the detector system 20. This second embodiment utilizes only a single detector 40, 54 that detects both the optical reference and the optical signal. In this illustration, the package is not shown for clarity.

Figure 2A:
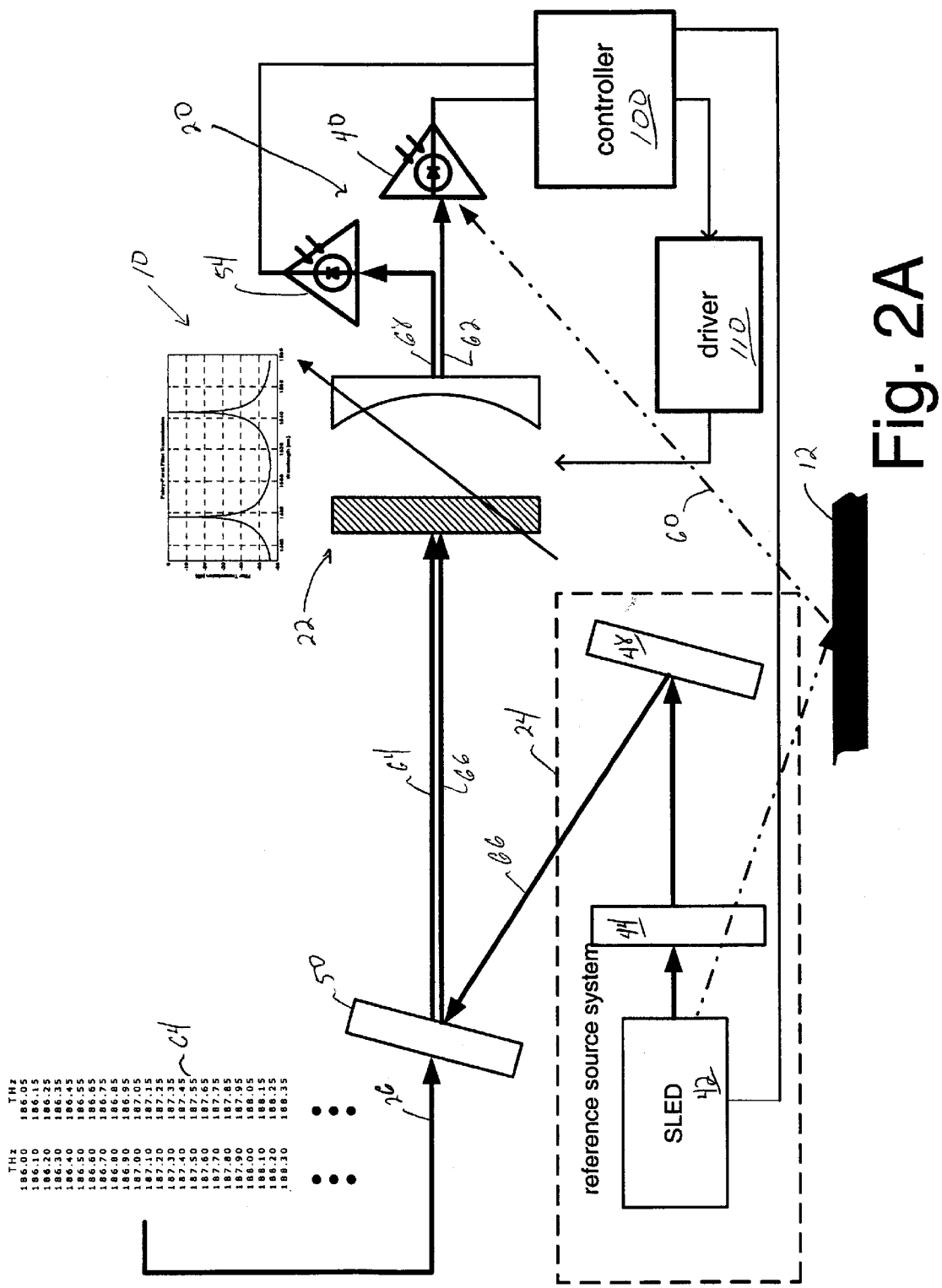
FIGS. 2A and 2B are block diagrams of optical filter systems illustrating modalities for reference source stray light interference.
Figure 2B:
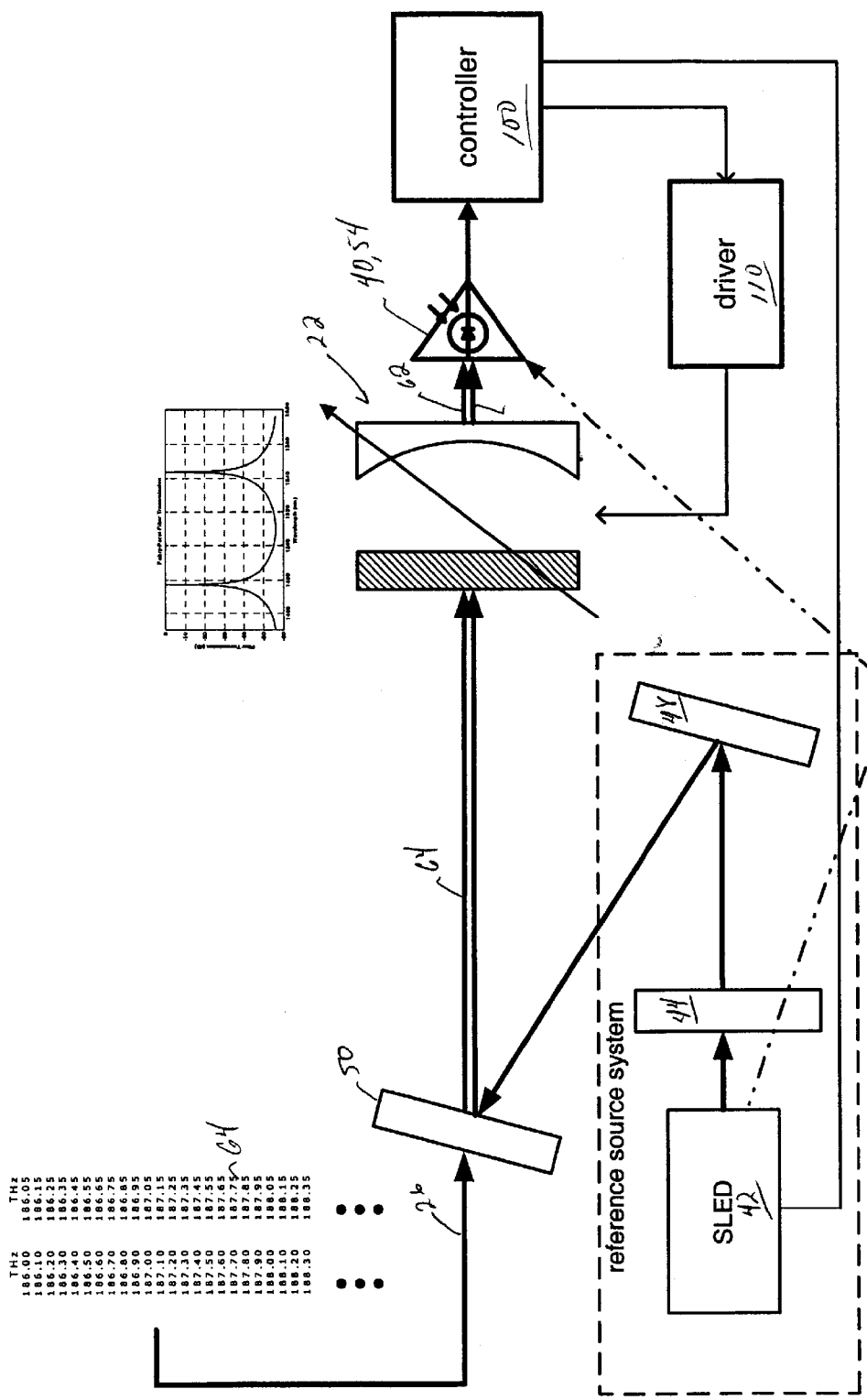

FIGS. 2A and 2B illustrate a stray light interference problem that can arise with the systems illustrated in FIGS. 1A and 1B. Stray light from the reference source system 24 can be reflected off the walls of the package 12. This stray light 60 can reach the signal detector 40. As a result, the optical signal detector 40 is thereby responsive both to the filtered optical signal 62 and to the stray interfering light 60 from the reference source system 24. This has the effect of decreasing the system's performance by raising the noise floor, for example. This effect occurs whether separate reference and signal detectors are used as shown in FIG. 2A or a common detector is used as illustrated in FIG. 2B since the detectors will not discriminate relative to wavelength.

Interestingly, another source of stray light in the package 12 comes from the optical signal source 26, but this stray light source is less of a problem.

That is, in the typical WDM system, the WDM optical signal 64 has multiple populated wavelength or channels.

One of these channels may correspond to the filter's instantaneous passband and thus propagate through the filter and be detected. The other channels, however, will be reflected since Fabry-Perot filters, for example, reflect light that is outside of their passband. The optical signal detector 40 will thus be responsive both to the filtered optical signal 62 and to any stray light that propagates through the optical train and is rejected by the Fabry-Perot tunable filter 22.

Generally, however, stray, optical signal light does not dramatically impact performance since the level of this stray light tends to decrease with decreases in the level of the optical signal 64. Thus, when the system 10 is detecting a low power optical signal 64, any stray light in the package from this optical signal 64 will generally be lower, thereby lowering the noise floor as the signal power decreases. Stray signal light will become more of a problem when there are high levels of power tilt between the channels in the WDM signal 64. In most optical systems, however, this type of tilt is minimized by design to prevent interchannel interference.

According to the invention, the system 10 has a controller 100 that controls both the operation of the tunable filter 22 via a driver 110 and the light source 42 of the optical reference system 24. They are commonly controlled, i.e., synchronized, so that the power to the light source 42 is applied during the reference scan, when the tunable filter's passband is scanning the spectral features of the optical reference 66, but decreased or completely removed when the tunable filter is scanning across the spectrum of the optical signal 64, i.e., signal scan.

Figure 3A:
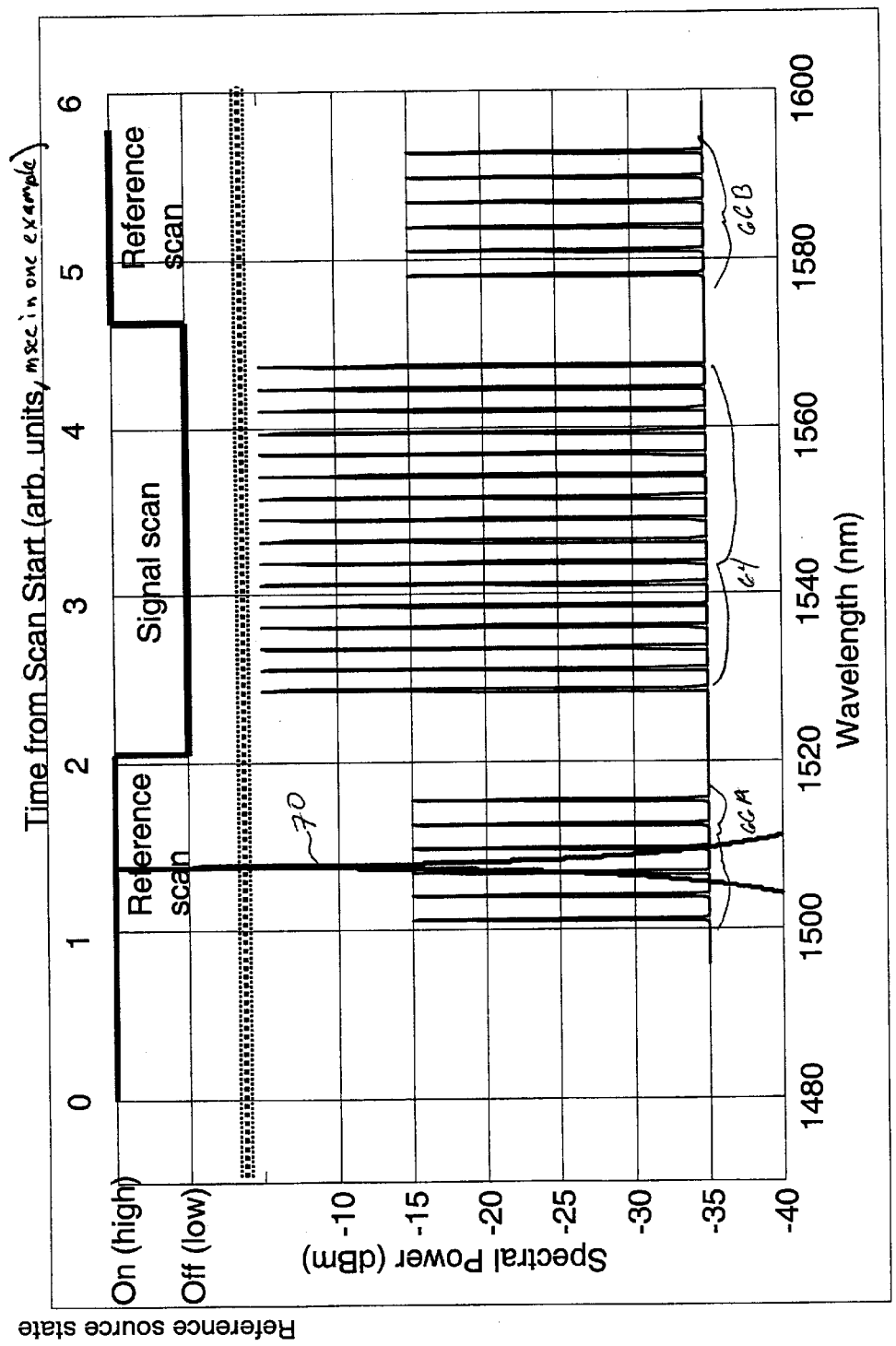
FIGS. 3A through 3C are plots of spectral power (dBm) as a function wavelength (nanometers) illustrating the spectral relationship between the optical reference and communications optical signal with plots of reference source state as a function of time from scan start (arbitrary units), according to the present invention.
Figure 3B:
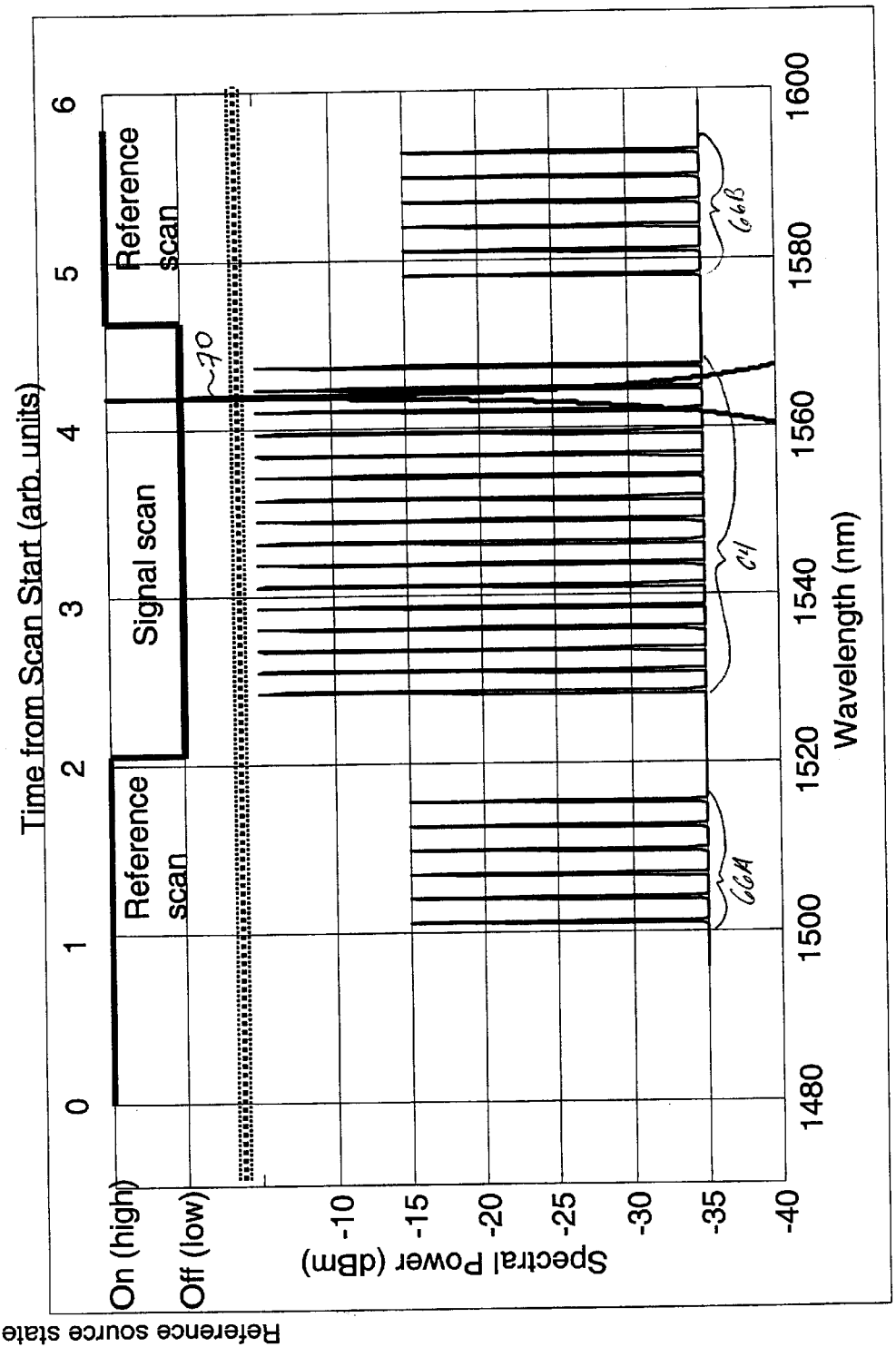
Figure 3C:
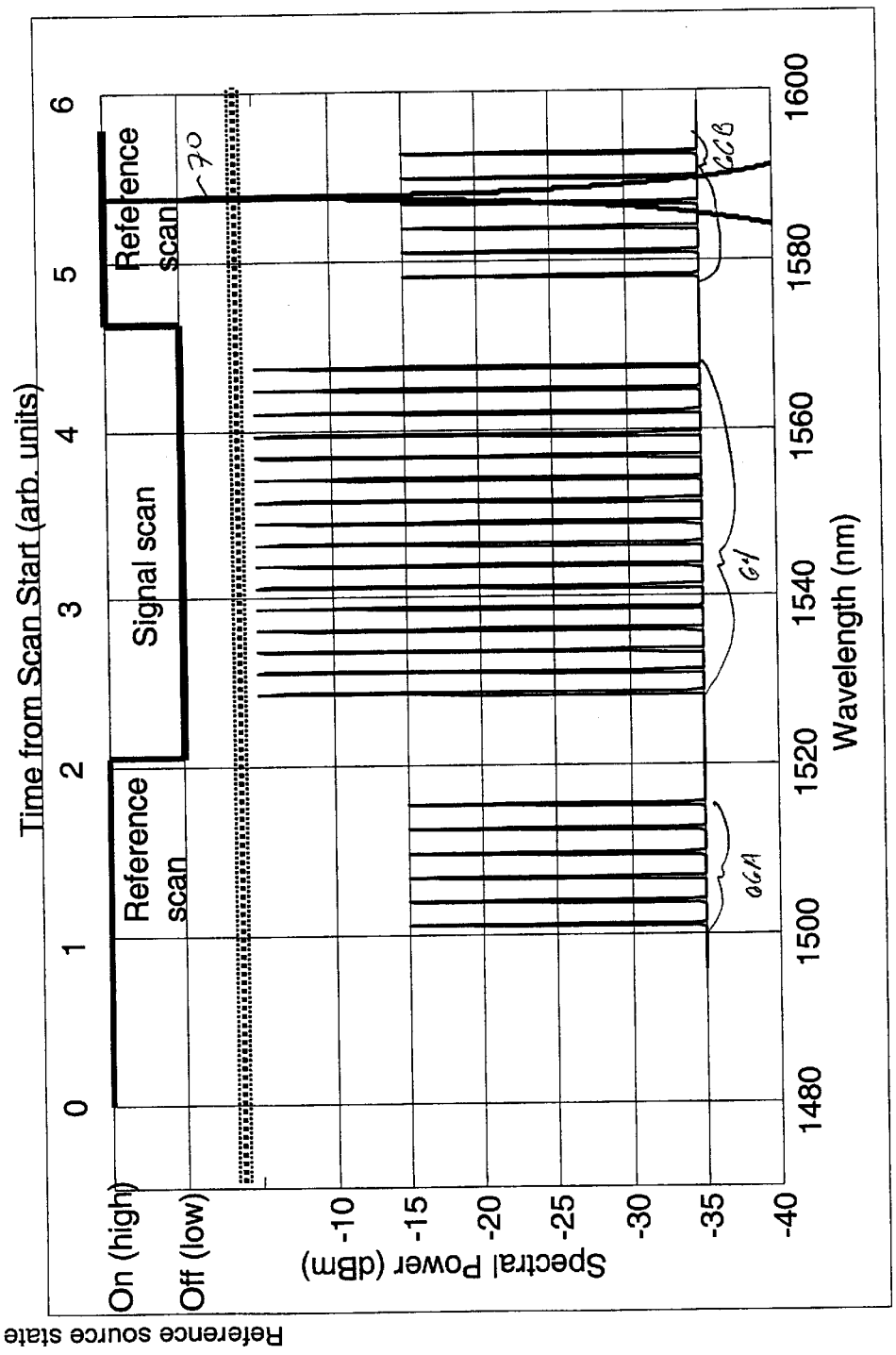

FIGS. 3A through 3C are plots of spectral power as a function of wavelength and reference source state as a function of time from scan start. The plots illustrate the spectral relationship between the optical signal 64 and the optical reference 66. Specifically, in the specific example of FIGS. 3A–3C, the optical reference 66 is spectrally divided into high frequency portion 66A that exists below the wavelength range of the optical signal 64 and the low frequency portion 66B that exists above the wavelength range of the optical signal 64.

During operation, the controller 100 controls the voltage driver 110 to execute a voltage ramp to drive the tunable filter 22. This results in the passband 70 of tunable filter 22 being scanned, in one example, first across the high frequency portion 66A of the optical reference as illustrated in FIG. 3A, then across the spectrum of the optical signal 64 as illustrated in FIG. 3B. Finally, the passband 70 of the tunable filter 22 is scanned across the low frequency portion 66B of the optical reference as illustrated in FIG. 3C.

According to this operation, the system 10 converts the scanned spectrum into a time series that is detected by the detector system 20 and analyzed by the controller 100.

According to the invention, time series nature of this spectral readout is used to minimize interference from the reference source system 24 during the signal scan.

Specifically, as illustrated FIG. 3A, the state of the reference source is on or high such that it is emitting light to generate the optical reference 66 during the reference scan, when the passband 70 of the tunable filter 22 is being scanned across the high frequency portion 66A of the optical reference 66.

In contrast, during the signal scan as illustrated in FIG. 3B, the reference source system 24, and specifically SLED 42, is de-energized or placed in a lower or low power state during the signal scan, when the passband 70 is within the spectral range of the optical signal 64. In one implementation, the reference source system is turned-off or switched to a non-emission or low emission state 2 milliseconds after the beginning of the scan (scan start) by the controller 100.

Finally, as illustrated in FIG. 3C, during the second portion of the reference scan, the reference source system is again switched on or into a high power state to enable detection of the low frequency portion 66B of the optical reference 66. This switch occurs about 4.6 milliseconds after scan start.

Providing a scan of the optical reference 66 spectrally above and below the optical signal has advantages in that it enables two-point calibration or curve fitting based on optical reference's spectral features that are spectrally above and below the optical signal 64.

Figure 4A:
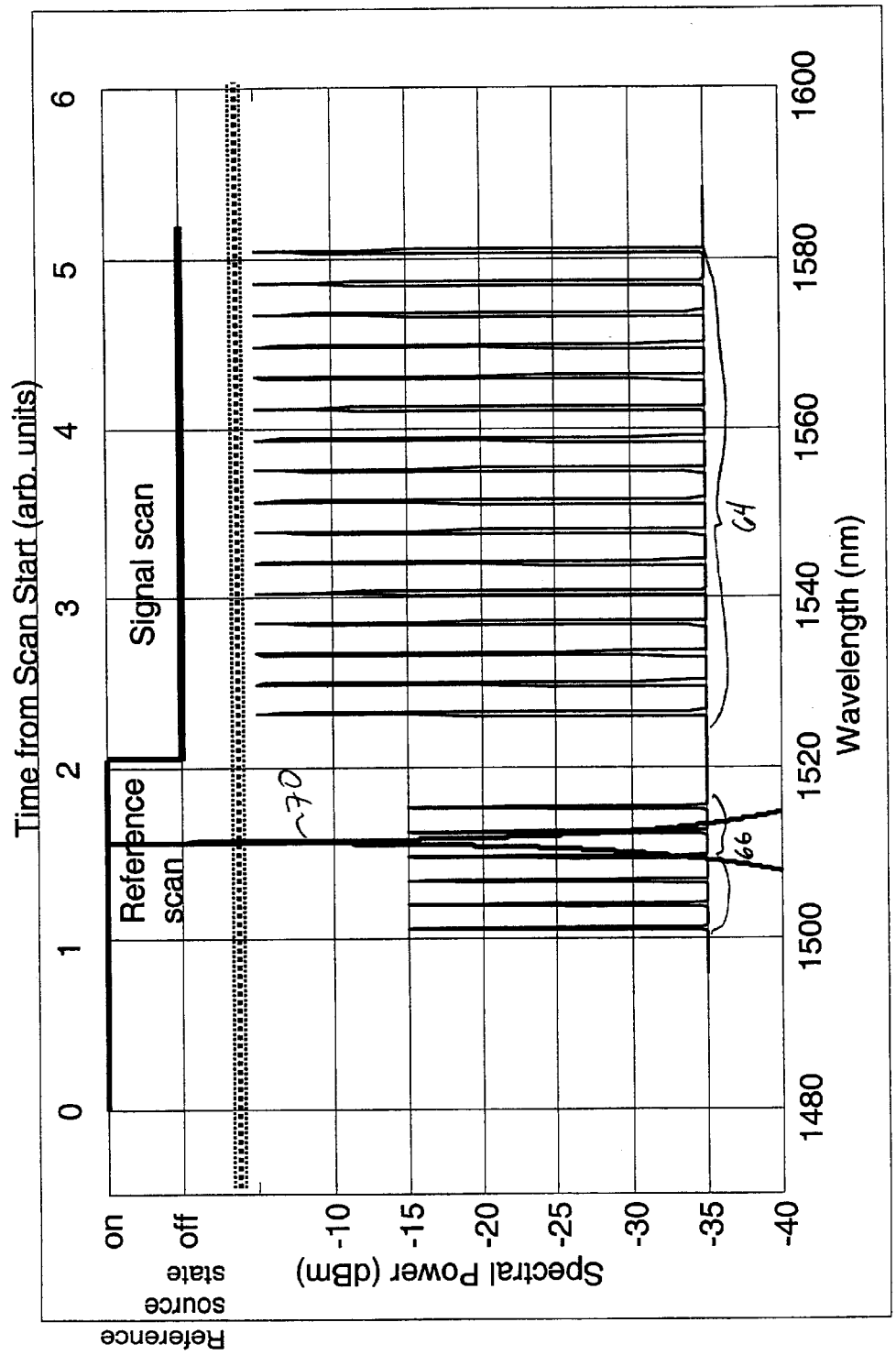
FIGS. 4A through 4B are plots of spectral power (dBm) as a function wavelength (nanometers) illustrating the spectral relationship between the optical reference and communications optical signal according to another embodiment with plots of the reference source state as a function of time from scan start (arbitrary units)
Figure 4B:
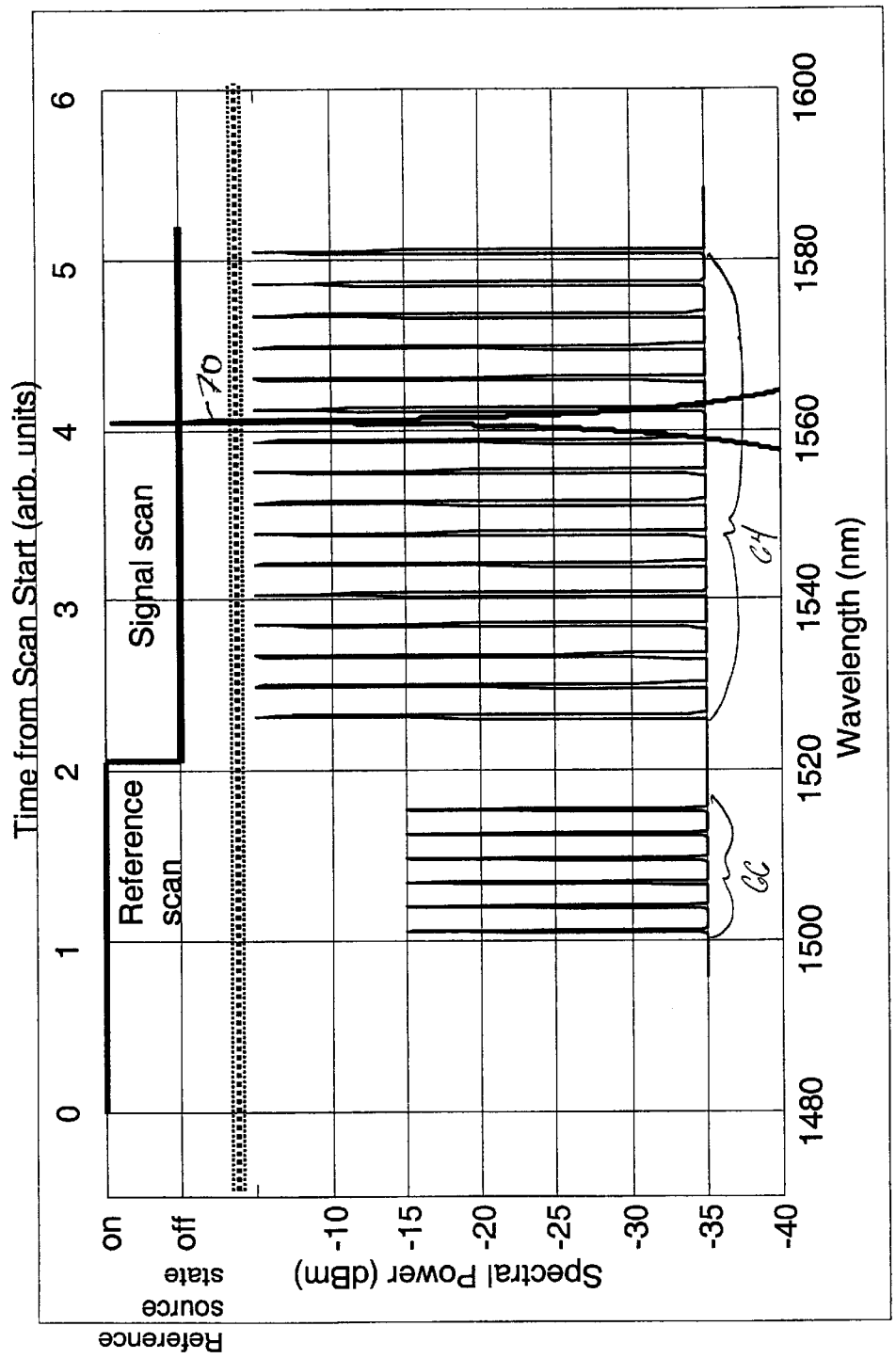

FIGS. 4A and 4B illustrate another embodiment in which the optical reference 66 is located spectrally only on one side of the optical signal 64. In the specific example, the passband 70 is scanned across the optical reference 66, illustrated in FIG. 4A, and then across the optical signal 64 as illustrated in FIG. 4B, with the reference source system being in a lower power state during the signal scan. This implementation provides decreased complexity regarding some of the fixed dichroic filters in the system, but enables only a single-sided calibration.

Figure 5A:
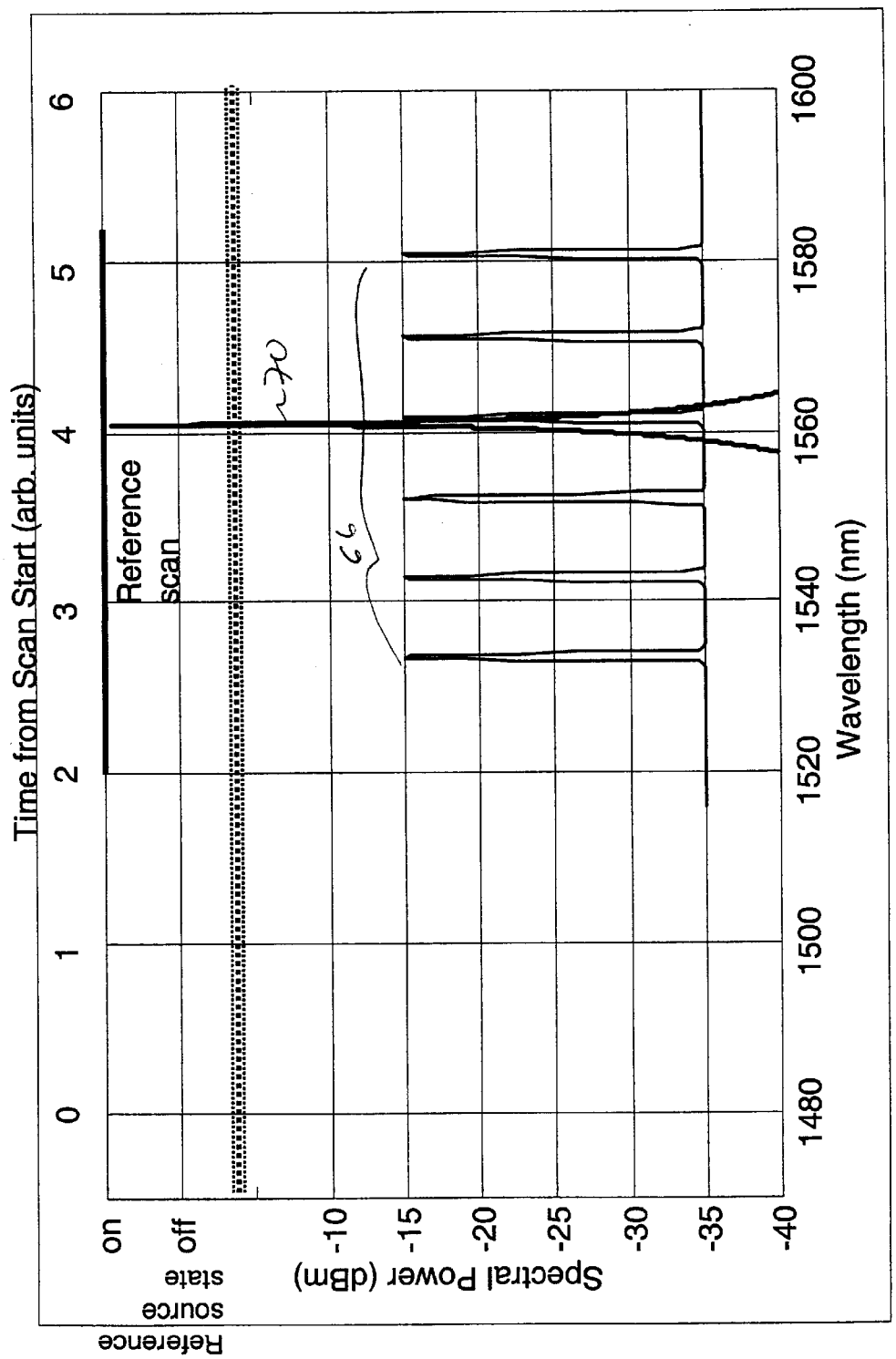
FIGS. 5A through 5B are plots of spectral power (dBm) as a function wavelength (nanometers) illustrating the spectral relationship between the optical reference and communications optical signal according to still another embodiment with plots of reference source state as a function of time from scan start (arbitrary units)
Figure 5B:
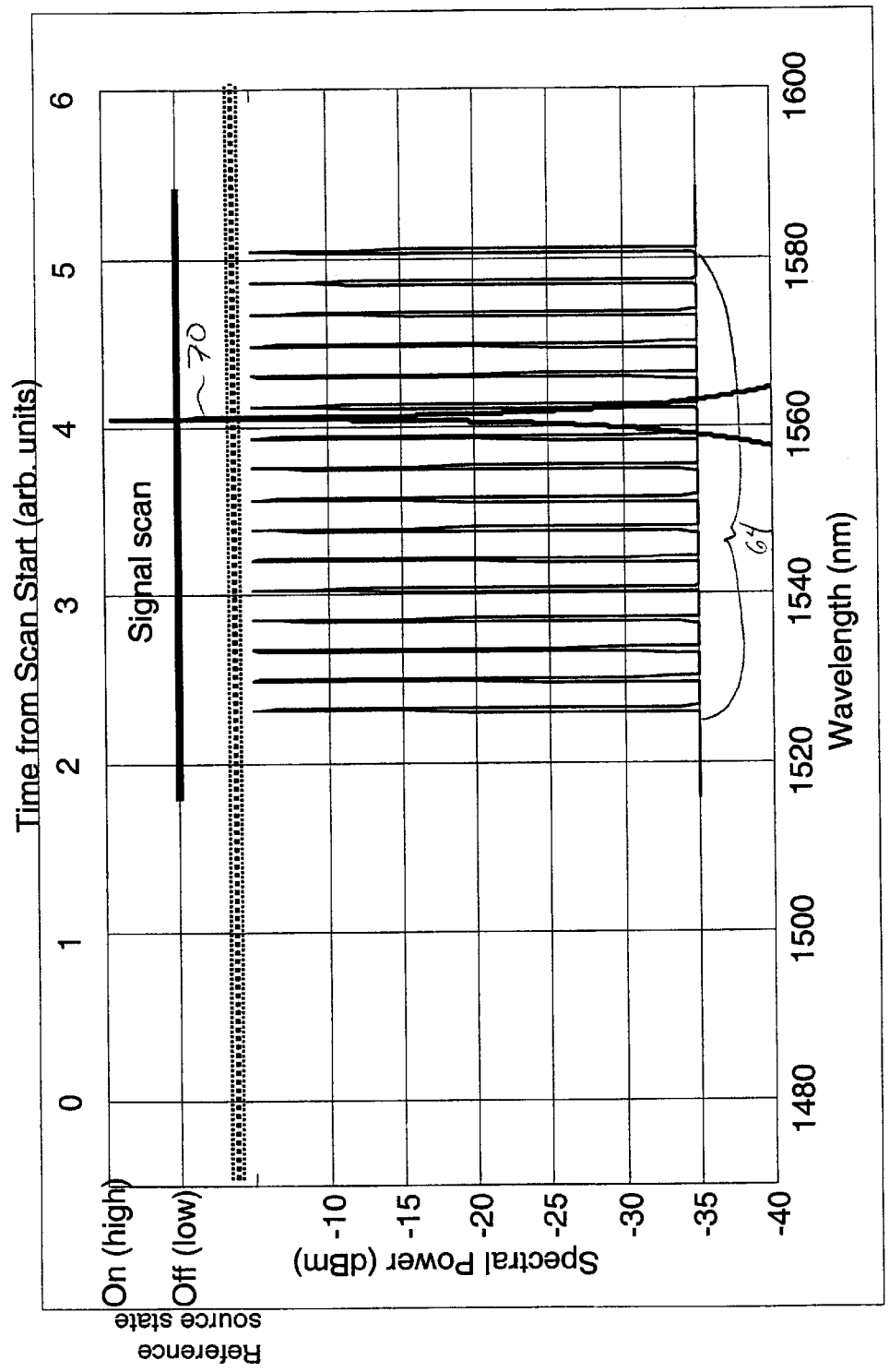

FIGS. 5A and 5B illustrate still another implementation of the present invention, which further decreases the complexity of the fixed filter material within the system 10. Specifically, in this example, the wavelength band of the optical reference and the optical signal are overlapping. It relies on the switching the optical reference and the optical signal.

Specifically, as illustrated in FIG. 5A, the passband 70 of the tunable filter system 22 is first scanned across the optical reference 66 in a reference scan. During this scan, the reference source system state is on or in a high emission state. During this scan, a beam switch or shutter 150 is activated, in some embodiments, to prevent the optical signal 64 from reaching the tunable filter, especially if only a single detector is used.

Then, as illustrated in FIG. 5B, the reference source state is switched to be de-energized or in a low light emission state and the shutter 150 removed from the beam path of the optical signal to thereby enable the signal scan.

Figure 6A:
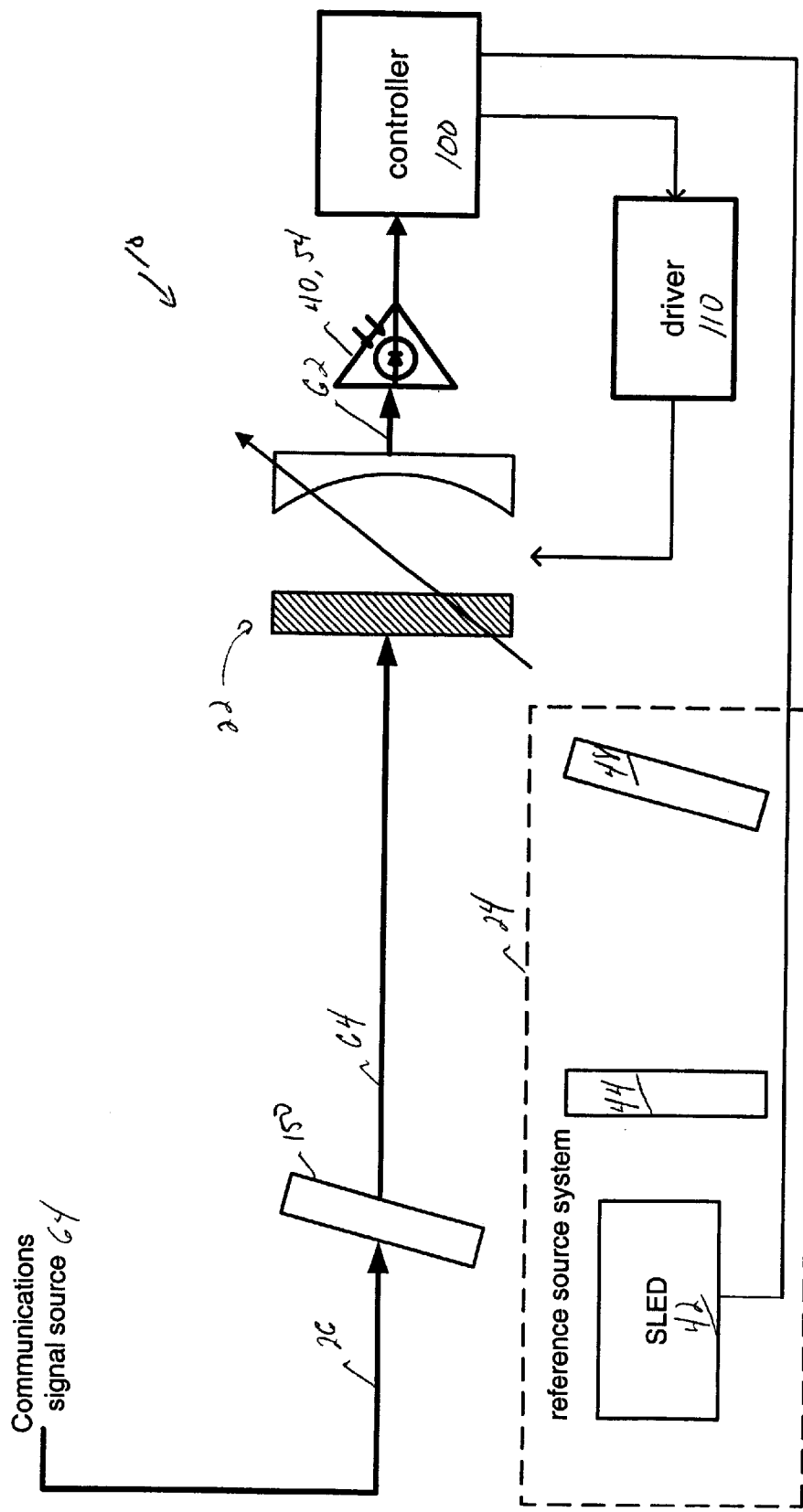
FIGS. 6A and 6B are block diagrams illustrating the operation of a tunable optical filter system during a reference scan and during a signal scan according to an embodiment of the present invention.
Figure 6B:
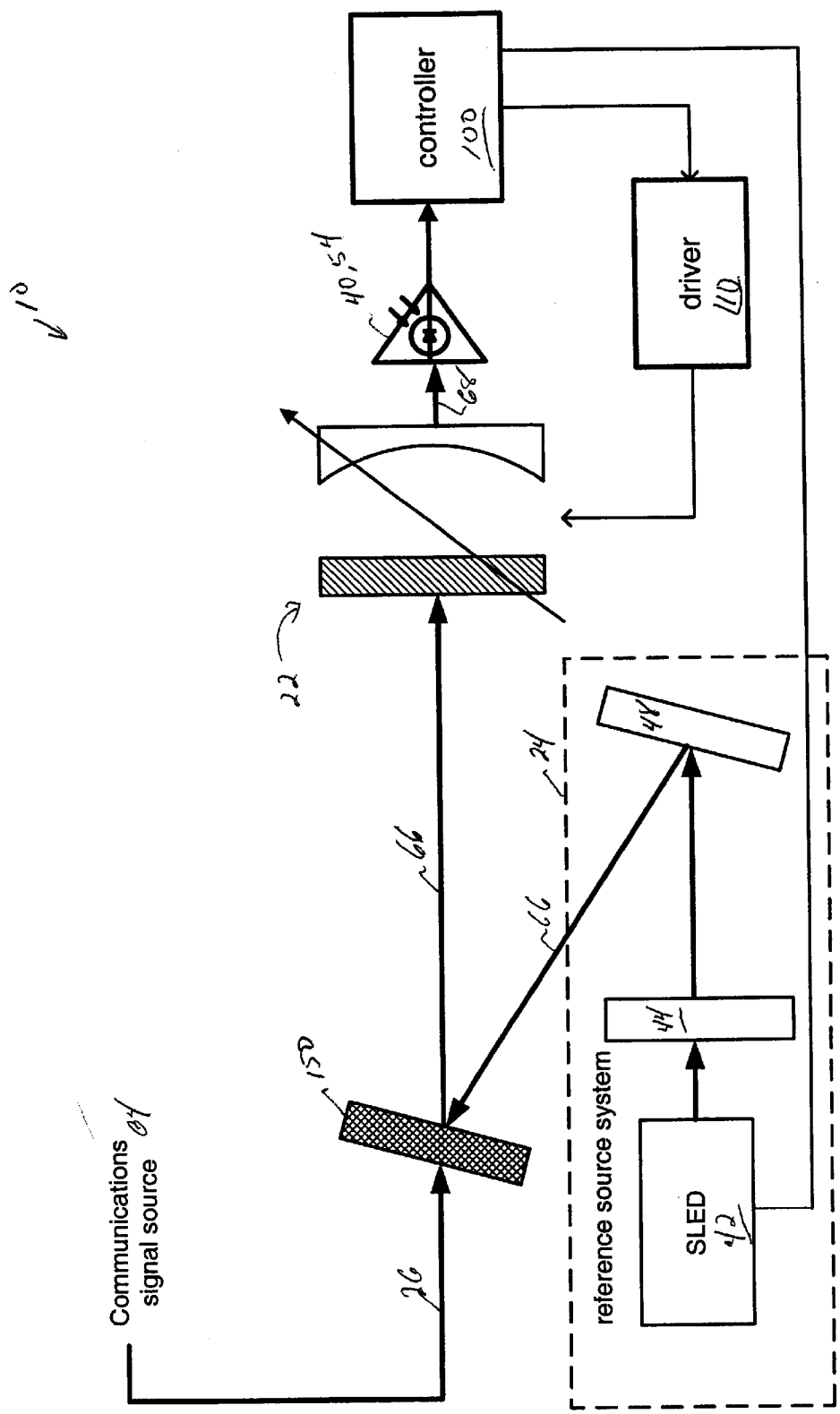

FIGS. 6A and 6B illustrate the optical system configuration corresponding to the operation described with reference to FIGS. 5A and 5B.

Specifically, during the signal scan, the system 10 is in a state as illustrated in FIG. 6A. The SLED 42 is in a low power state and not producing the optical reference, or a low or very low intensity optical reference, and the beam switch/shutter 150 is in a transmissive state to thereby enable the optical signal 66 to reach the tunable filter 22 and thereby be detected by the detector 40, 54.

FIG. 6B shows the state of the optical system 10 during the reference scan. Specifically, in this state, the shutter 150 blocks the transmission of the optical signal 64 to the tunable filter 22, but enables the optical reference 66 that is generated by the now energized reference source system 24 to be first filtered by the tunable filter 22 and then detected by the detector 40, 54. The advantage of this system is that it requires no WDM filters in some examples, but requires the addition of the beam shutter/switching element 150.

While this invention has been particularly shown and described with references to preferred embodiments thereof, it will be understood by those skilled in the art that various changes in form and details may be made therein without departing from the scope of the invention encompassed by the appended claims. For example, in some implementations, the spectrum of the optical reference and the optical signal may not be adjacent but instead displaces by a free spectral range of the tunable filter. In this case, different orders of the filter are used to scan the optical reference and the optical signal.

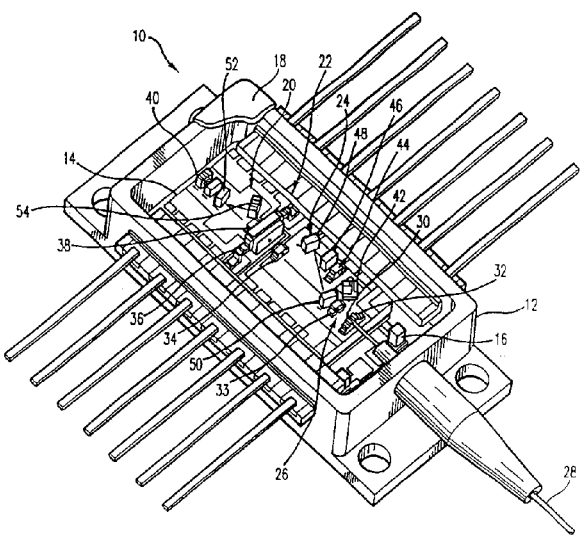

What is claimed is:

1. A tunable optical filter system, comprising
   a package;
   a tunable filter installed within the package;
   a reference source system, within the package, that generates an optical reference that is filtered by the tunable filter;
   a detector system that detects the optical reference and an optical signal after being filtered by the tunable filter; and
   a controller that energizes the reference source system during a reference scan in which the tunable filter is scanned across a spectrum of the optical reference and reduces power to the reference source system during a signal scan in which the tunable filter is scanned across the optical signal.

2. A tunable optical filter system as claimed in claim 1, wherein the package is a hermetic package.

3. A tunable optical filter system as claimed in claim 1, wherein the tunable filter is a MEMS Fabry-Perot tunable filter.

4. A tunable optical filter system as claimed in claim 3, wherein the Fabry-Perot tunable filter has a single resonant cavity.

5. A tunable optical filter system as claimed in claim 1, wherein the optical reference has stable spectral features.

6. A tunable optical filter system as claimed in claim 1, wherein the optical reference system comprises a light source and a filter that generates the optical reference from an emission of the light source.

7. A tunable optical filter system as claimed in claim 6, wherein the filter is an etalon.

8. A tunable optical filter system as claimed in claim 1, further comprising a fiber pigtail endface that functions as source for the optical signal.

9. A tunable optical filter system as claimed in claim 1, wherein the detector system comprises a detector that detects the optical reference and the optical signal.

10. A tunable optical filter system as claimed in claim 1, wherein the detector system comprises a first detector that detects the optical reference and a second detector that detects the optical signal.

11. A tunable optical filter system as claimed in claim 1, wherein the controller ramps the voltage to the tunable filter to perform the reference scan either before or after the signal scan.

12. A tunable optical filter system as claimed in claim 11, wherein the ramp is an increasing or decreasing voltage ramp.

13. A tunable optical filter system as claimed in claim 1, wherein the controller ramps the voltage to the tunable filter to perform the reference scan both before and after the signal scan.

14. A tunable optical filter system as claimed in claim 1, wherein the controller ramps the voltage to the tunable filter to perform the reference scan and then ramps the voltage to the tunable filter again to perform the signal scan.

15. A tunable optical filter system as claimed in claim 1, wherein the controller removes power to the reference source system during signal scan.

16. A tunable optical filter system as claimed in claim 1, wherein the controller lowers power to the reference source system during signal scan so that scattered light from the reference source at the detector is below a noise floor.

17. A method for controlling a tunable optical filter system, the method comprising:
   driving a tunable optical filter to spectrally scan over an optical reference spectrum and an optical signal spectrum;
   controlling a reference source system to generate the optical reference while the tunable filter is scanning the optical reference spectrum; and
   scanning the tunable filter over the optical signal spectrum with power to the reference source system lowered.

18. A method as claimed in claim 17, wherein the step of driving the tunable filter comprises:
   ramping the drive voltage to scan the optical reference spectrum; and then
   ramping the drive voltage gain to scan the optical signal spectrum.

19. A method as claimed in claim 18, further comprising blocking an optical signal from reaching the tunable filter during the scan of the optical reference spectrum.

20. A method as claimed in claim 17, wherein the step of driving the tunable filter comprises scanning over the optical reference spectrum either before or after the optical signal spectrum.

21. A method as claimed in claim 17, wherein the step of driving the tunable filter comprises scanning over the optical reference spectrum before and after the scan of the optical signal spectrum.

22. A method as claimed in claim 17, wherein the step of scanning the tunable filter over the optical signal spectrum comprises removing power to the reference source system.

23. A method as claimed in claim 17, wherein the step of scanning the tunable filter over the optical signal spectrum comprises lowering power to the reference source system to lower a noise floor of the system.

* * * * *

UNITED STATES PATENT AND TRADEMARK OFFICE
CERTIFICATE OF CORRECTION

PATENT NO. : 6,665,458 B2
DATED : December 16, 2003
INVENTOR(S) : Jeffrrey A. Korn It is certified that error appears in the above-identified patent and that said Letters Patent is hereby corrected as shown below:

Delete the Title page and substitute the attached Title page.

Delete drawings sheets 1-13 (Figs. 1-6) and substitute with 13 sheets (Figs. 1-13) of formal drawings.

Signed and Sealed this

Fourteenth Day of September, 2004

JON W. DUDAS
*Director of the United States Patent and Trademark Office*

United States Patent
Korn

(12)
(10) Patent No.: US 6,665,458 B2
(45) Date of Patent: Dec. 16, 2003

(54) IN-PACKAGE TEMPORALLY MODULATED REFERENCE SOURCE FOR TUNABLE OPTICAL FILTER SYSTEM

(75) Inventor: Jeffrey A. Korn, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/934,664

(22) Filed: Aug. 22, 2001

(65) Prior Publication Data

US 2003/0210847 A1 Nov. 13, 2003

(51) Int. Cl.[7] .............................. G02B 6/26; G02B 6/42
(52) U.S. Cl. ........................................................... 385/15
(58) Field of Search ............................ 385/14–18, 31, 385/38, 88, 92, 73; 359/73, 129

(56) References Cited

U.S. PATENT DOCUMENTS

| | | | | |
|---|---|---|---|---|
| 5,281,931 A | * | 1/1994 | Bailey et al. | 333/17.1 |
| 5,969,834 A | * | 10/1999 | Farber et al. | 359/110 |
| 6,144,678 A | * | 11/2000 | Hamada | 372/20 |
| 6,374,007 B1 | * | 4/2002 | Hagelin et al. | 385/17 |
| 6,375,364 B1 | * | 4/2002 | Wu | 385/88 |
| 6,426,830 B1 | * | 7/2002 | Robinson | 359/308 |
| 6,542,659 B2 | * | 4/2003 | Flanders | 385/20 |

* cited by examiner

Primary Examiner—Robert H. Kim
Assistant Examiner—Richard Kim
(74) Attorney, Agent, or Firm—J. Grant Houston

(57) ABSTRACT

A tunable optical filter system 10 has a reference source system 24 that is integrated with the tunable filter 22 on bench 14 and within hermetic package 12. The reference source system 24 is temporally modulated to decrease interference or crosstalk into the scan of the optical signal 64 of interest. Specifically, a system controller 100 energizes the reference source during a reference scan in which the tunable filter 22 is scanned across a spectrum of the optical reference 66. The controller 100, however, lowers, such as simply decreasing or entirely cutting, power to the reference source system 24 during a signal scan, in which the tunable filter 22 is scanned across the optical signal's spectrum. In this way, interference during the signal scan from the reference source system is reduced.

23 Claims, 13 Drawing Sheets